United States Patent [19]
Carrier et al.

[11] Patent Number: 5,937,622
[45] Date of Patent: Aug. 17, 1999

[54] CORDLESS ELECTRIC LAWN MOWER HAVING ENERGY MANAGEMENT CONTROL SYSTEM

[75] Inventors: David A. Carrier, Baltimore; Samuel G. Woods, Bel Air, both of Md.; David S. Strong, Battersea, Canada; Carl W. Gifford, Elizebethtown, Canada; Colin M. Dyke, Augusta, Canada

[73] Assignee: Black & Decker Inc., Newark, Del.

[21] Appl. No.: 08/686,743

[22] Filed: Jul. 25, 1996

Related U.S. Application Data

[60] Provisional application No. 60/001,535, Jul. 26, 1995.
[51] Int. Cl.$^6$ ..................................................... A01D 34/78
[52] U.S. Cl. .................. 56/11.9; 56/10.2 R; 56/DIG. 15
[58] Field of Search ................................ 56/11.9, 102 G, 56/10.2 R, DIG. 15, 10.8, 16.7, 17.5, DIG. 2

[56] References Cited

U.S. PATENT DOCUMENTS

| | | |
|---|---|---|
| 3,809,975 | 5/1974 | Bartels . |
| 3,841,069 | 10/1974 | Weck . |
| 3,892,037 | 7/1975 | Brown . |
| 4,011,491 | 3/1977 | Grover et al. . |
| 4,145,864 | 3/1979 | Brewster, Jr. . |
| 4,162,436 | 7/1979 | Waldorf et al. . |
| 4,247,807 | 1/1981 | Wilson . |
| 4,333,302 | 6/1982 | Thomas et al. . |
| 4,549,122 | 10/1985 | Berkopec et al. . |
| 4,626,765 | 12/1986 | Tanaka . |
| 4,734,629 | 3/1988 | Lessig, III et al. . |
| 4,791,544 | 12/1988 | Gautherin et al. . |
| 4,835,949 | 6/1989 | Seyerle . |
| 4,887,415 | 12/1989 | Martin . |
| 4,893,067 | 1/1990 | Bhagwat et al. . |
| 5,015,928 | 5/1991 | Yang . |
| 5,017,854 | 5/1991 | Gully et al. . |
| 5,208,519 | 5/1993 | Dykstra et al. . |
| 5,293,156 | 3/1994 | Shoji et al. . |
| 5,315,287 | 5/1994 | Sol . |
| 5,367,599 | 11/1994 | Okada . |
| 5,388,176 | 2/1995 | Dykstra et al. . |
| 5,455,884 | 10/1995 | Yang . |
| 5,490,370 | 2/1996 | McNair et al. . |
| 5,496,658 | 3/1996 | Hein et al. . |
| 5,502,361 | 3/1996 | Moh et al. . |
| 5,502,957 | 4/1996 | Robertson . |
| 5,619,845 | 4/1997 | Bruener et al. ...................... 56/11.9 X |

FOREIGN PATENT DOCUMENTS

| | | |
|---|---|---|
| 2034356 | 10/1993 | Canada . |
| 1332628 | 10/1994 | Canada . |
| 2636-498 | 3/1990 | France . |
| 2923-272 | 12/1980 | Germany . |

(List continued on next page.)

Primary Examiner—Terry Lee Melius
Attorney, Agent, or Firm—Harness, Dickey & Pierce, P.L.C.

[57] ABSTRACT

A cordless electric mower having an energy management system that allows a user to operate the cutting blade motor of the mower at a wide range of user selected speeds. The mower is provided with a user adjustable throttle control which, when in the wide-open position allows the cutting blade motor to be rotated at a maximum, predetermined speed. When the throttle is set to some lesser speed, the system automatically implements a speed foldback routine whenever the mower encounters heavy loading which would result in an undesirably high current draw on the battery. When the speed foldback routine is implemented, the system limits the maximum amount of current that can be drawn by the motor until the excessive loading condition has been removed. Once the excessive loading condition has been removed, the speed foldback routine automatically increases the speed of the blade motor back up to almost the originally selected speed. This greatly improves the operating efficiency of the mower and thereby significantly extends the available operating time of the mower on a single charge. The state-of-charge of the battery is also monitored continuously during operation. An LED display provides the user with an indication of the approximate battery charge remaining.

12 Claims, 22 Drawing Sheets

FOREIGN PATENT DOCUMENTS

| | | |
|---|---|---|
| 54-658 | 7/1980 | Japan . |
| 1254912 | 11/1971 | United Kingdom . |
| 1371128 | 10/1974 | United Kingdom . |
| 1567208 | 5/1980 | United Kingdom . |
| 2047444 | 11/1980 | United Kingdom . |
| PCT US/94/ 09431 | 3/1995 | WIPO . |

CORDLESS ELECTRIC LAWN MOWER HAVING ENERGY MANAGEMENT CONTROL SYSTEM

CROSS REFERENCE TO RELATED APPLICATION

This application is a continuation-in-part of U.S. provisional application Ser. No. 60/001,535, entitled "Cordless Electric Lawn Mower Having Energy Management Control System", filed on Jul. 26, 1995, and presently pending.

BACKGROUND OF THE INVENTION

The present invention relates to electric lawn mowers and in particular to a cordless electric lawn mower having an electronic energy management control system for maximizing the efficiency of the mower.

Due to concerns regarding urban air pollution, as well as other factors, electric lawn mowers are gaining in popularity. Moreover, due to the inconveniences and operating limitations of corded electric mowers, battery operated or cordless electric mowers are preferred. However, the principal disadvantage of cordless electric mowers is the run time of the mower on a single battery charge. For obvious reasons, it is highly desirable for a cordless electric mower to possess the capacity to complete the mowing of a typical size lawn on a single charge. A run time of approximately one hour is generally required for this purpose. Unfortunately, and often times contrary to claimed performance, most cordless electric mowers have a real world run time of approximately one-half hour which is usually insufficient to complete the desired task.

Although use of a larger battery would certainly overcome this problem, the cost and weight penalties associated with larger batteries preclude their use on non-commercial mowers. Consequently, the size and weight of the battery that can be used is limited. Present cordless electric mowers typically employ a 24-volt lead-acid battery with a rated capacity of approximately 20 amp-hours. However, not all of this energy is available for use. For example, with lead-acid batteries, 80% efficiency is as high as can realistically be achieved with any appreciable load on the motor. Consequently, give a 24-volt lead-acid battery rated at 20 amp-hours, the maximum available energy from the battery is practically limited to approximately 17 amp-hours. Moreover, when the level of current draw on the battery is increased, the efficiency of the battery decreases even further to 50% or less. This phenomenon thus also greatly affects the total available run time of the mower under normal operating conditions.

Therefore, in order to substantially improve the operating time of a cordless electric mower, given the available battery energy, it is necessary to consider the total efficiency of the mower, including not only the efficiency of the motor, but also the efficiency of the battery, as well as the efficiency of the cutting blade. Conventional techniques for improving mower efficiency have generally focused on the motor by attempting, for example, to minimize friction losses with more expensive bearings. However, the efficiencies gained with these approaches are limited and therefore of questionable value given their associated costs. Generally overlooked in these efforts to improve overall mower operating efficiency is the impact of blade speed.

In particular, most rotary powered lawn mowers, whether gas or electric powered, typically rotate the cutting blade at a speed of between 3800–4000 rpm. This speed provides very good cutting results, including in mulching and bagging applications. However, at a no-load blade speed of 3800 rpm, the blade speed is the greatest contributing factor to the overall efficiency of the mower. This is because the total watts consumed by the mower is a function of the cube of the blade speed. Accordingly, even though the functional results achieved by operating the cutting blade at these speeds are very good, the level of energy required to do so is also very high.

On the other hand, good cutting results can still be achieved at blade speeds of approximately 3000 rpm. Moreover, substantially less energy is required to operate the mower at such cutting blade speeds. For example, under a no-load condition, it requires approximately 543 watts of power to rotate the cutting blade at 3800 rpm, but only 218 watts of power to rotate the cutting blade at 3000 rpm. Accordingly, significant improvements in overall efficiency can be achieved by controlling the rotational speed of the motor so as to limit the speed of the cutting blade.

SUMMARY OF THE INVENTION

The primary purpose of the present invention, therefore, is to provide an electronic control circuit for a cordless electric mower that is adapted to control the power supplied to the motor so as to regulate the speed of the cutting blade to a lower than maximum operational speed, herein 2800–3200 rpm. Speed regulation of the permanent magnet D.C. motor is accomplished by adjusting the applied voltage to the motor in response to various system feedback variables. In particular, the preferred control circuit monitors battery voltage, battery current, and MOSFET voltage, and derives therefrom the motor voltage required to maintain the desired motor speed. Accordingly, closed-loop speed regulation is achieved inexpensively without requiring a separate motor speed transducer.

In addition, the controller according to the present invention also provides a unique current limiting function to further improve the overall operating efficiency of the system. In particular, under very heavy loading conditions, the current draw from the battery can go up dramatically causing the efficiency of the battery to drop significantly. Accordingly, it is known to provide current limiters which interrupt power to the motor when the current draw exceeds a predetermined level. The disadvantage of this approach, however, is that the operation of the mower is completely disabled, which is inconvenient and disconcerting to the operator and therefore not very user friendly.

The controller according to the present invention overcomes this disadvantage by responding to the occurrence of a high load condition in a different manner. Specifically, rather than simply interrupting power to the motor, the present invention limits the maximum current that can be drawn by the motor by gradually reducing the speed of the motor. Thus, if the mower is subjected to a very heavy loading condition, instead of permitting the current draw to increase to a high level, the speed of the motor is allowed to decrease as the level of motor current is kept below a predetermined threshold. This slowing of the motor speed is readily discernible by the operator and therefore serves as an intuitive signal to slow down or temporarily stop the progress of the mower until the motor resumes its normal speed. If, however, the heavy loading condition persists and the speed of the motor drops below a predetermined level, the controller will completely interrupt power to the motor. Alternatively, the power to the motor could be interrupted if the heavy loading condition persists for a predetermined time period.

In an alternative preferred embodiment of the present invention the mower incorporates a user adjustable throttle control which allows the user to select a desired blade speed from within a range of blade speeds. Thus, the user can select between a maximum blade speed to provide optimum cutting results or a lesser blade speed which will still provide good cutting results but will significantly prolong the run time of the battery on a single charge.

In the alternative preferred embodiment mentioned above, the speed foldback feature is also incorporated to momentarily reduce the speed of the motor, and thus the current drawn by the motor, whenever an excessive loading condition is encountered during mowing. When the excessive loading condition is removed, the system automatically, gradually increases the motor speed back up to almost the speed selected by the user. If the excessive loading condition continues, in other words, if the user does not slow down with the mower or stop pushing the mower entirely, the blade motor speed is gradually, continuously automatically reduced until a maximum speed foldback limit is reached, at which point the system automatically will interrupt current flowing to the blade motor to stop the motor. After a predetermined period of time, the user is allowed to restart the mower and continue mowing.

The alternative preferred embodiment described above also includes a "soft start" feature in which the duty cycle of a PWM drive signal to the motor, upon initial start up of the blade motor, is limited in accordance with a first slew rate to thus reduce the instantaneous current draw on the battery during this period of time. Thereafter, the increase in current to the blade motor supplied to the blade motor is made in accordance with a second slew rate which provides for a more rapid rate of change in the duty cycle of the drive signal supplied to the motor.

Additional objects and advantage of the present invention will become apparent from a reading of the following detailed description of the preferred embodiment which makes reference to the drawings in which:

DETAILED DESCRIPTION OF THE PREFERRED EMBODIMENTS

Figure 1:
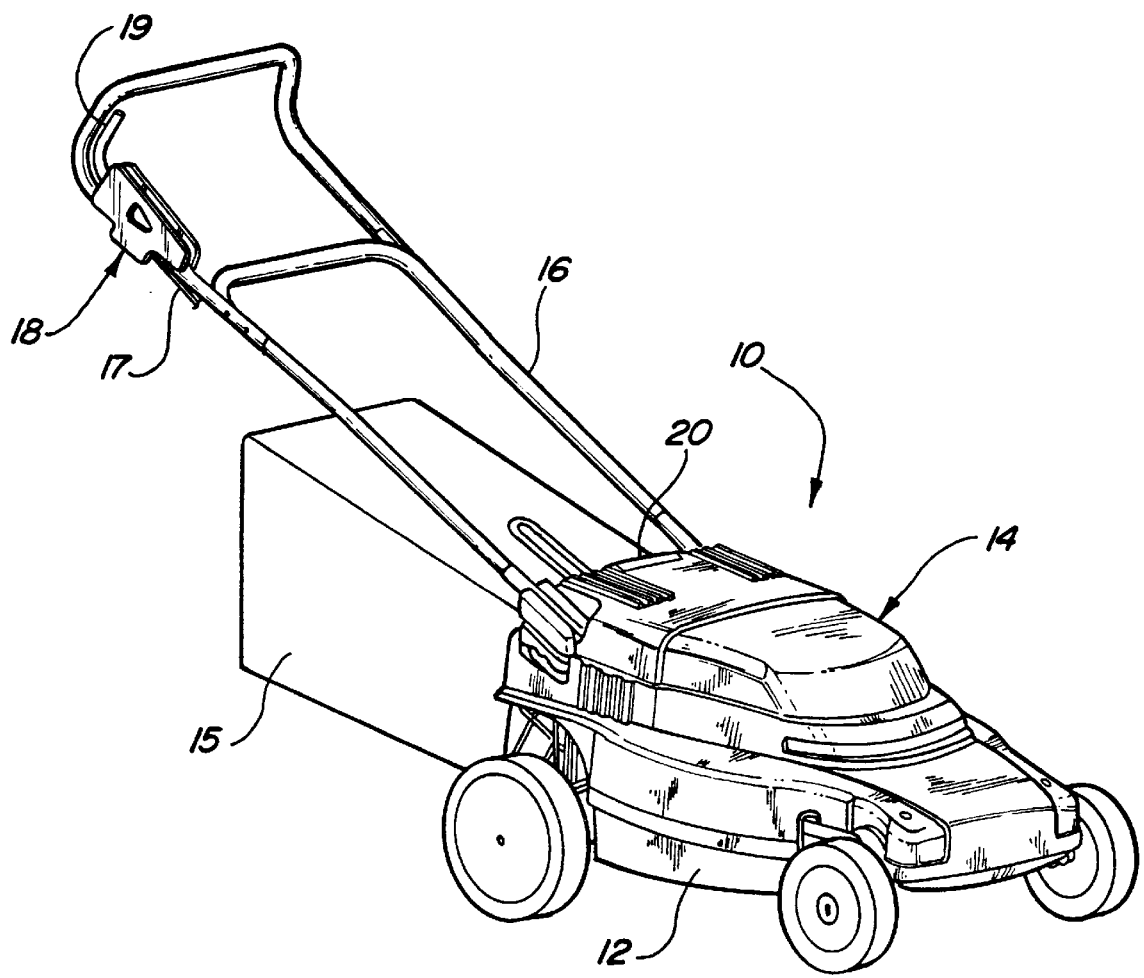
FIG. 1 is a perspective view of a cordless electric lawn mower of the general type to which the present invention is directed.

Referring to FIG. 1, a pictorial view of a cordless electric lawn mower incorporating an energy management control system according to the present invention is shown. The cordless electric lawn mower 10 illustrated in FIG. 1 comprises a mower deck 12 having mounted thereon under shroud 14 a battery that is adapted to power an electric motor for rotatably driving about a vertically disposed axis a cutting blade located beneath the mower deck 12. Grass clippings are discharged into a receptacle 15 mounted on the rear of the mower deck 12. A handle 16 that is removably attached to the mower deck 12 has mounted thereon an ON/OFF switch mechanism 18 for controlling the application of power from the battery to the motor via a cable 17. Preferably, the ON/OFF switch mechanism 18 includes an actuating lever 19 that requires two physically distinct movements to actuate the switch between the OFF and ON positions. A switch of this type is described in U.S. Pat. No. 4,044,532, assigned to the assignee of the present application. In addition, the switching lever 19 is normally biased into the OFF position so that when the operator releases the handle, power to the motor is automatically interrupted. The present mower also preferably includes an electromechanical interlock, as described in U.S. Pat. No. 5,085,043, assigned to the assignee of the present application. The interlock includes a "key" 20 that is shown in FIG. 1 in the installed or "RUN" position. When the key member 20 is installed as shown, an interlock switch located inside the shroud 14 is actuated, thereby enabling the power circuit so that energization of the motor is controlled by the handle switch 18.

Figure 2:
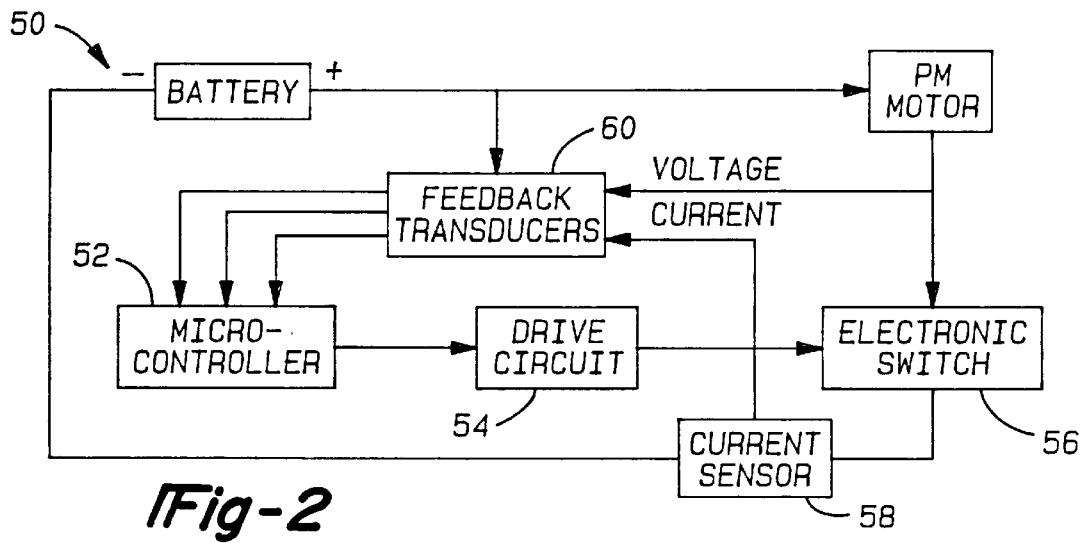
FIG. 2 is a block diagram of the motor control circuit according to the present invention.
Figure 4:
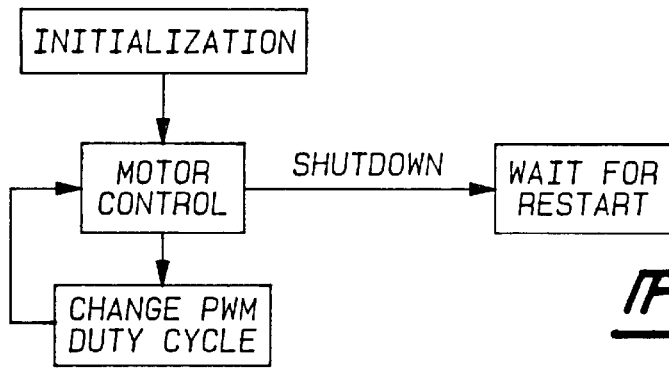
FIGS. 4–8 are flow chart diagrams of the software programmed into the microcontroller shown in FIG. 3.
Figure 5:
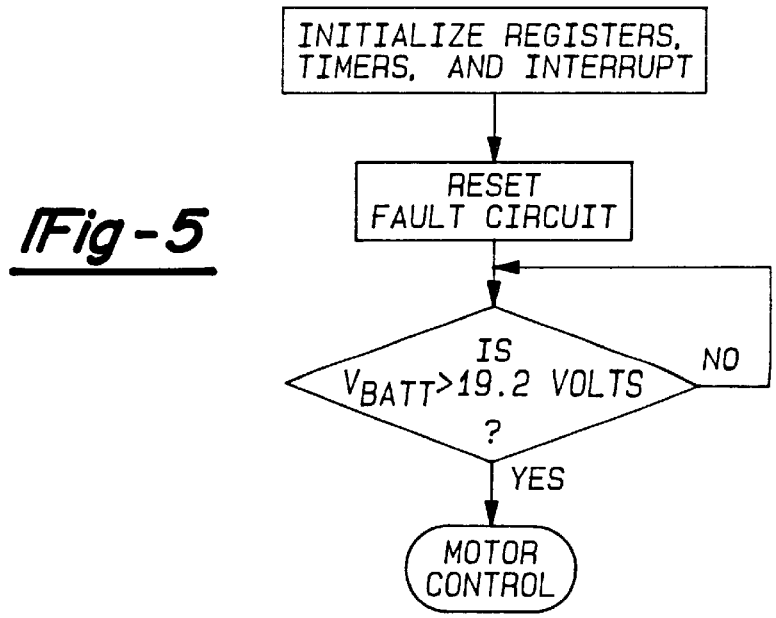

Turning to FIG. 2, a block diagram of the motor control circuit according to the present invention is shown. The control circuit includes a microcontroller 52 that is programmed to control the speed of the motor by controlling the duty cycle of a pulse width modulated control signal that is supplied to a drive circuit 54 which in turn controls the operation of an electronic switching circuit 56. The electronic switching circuit 56, together with a current sensor 58, are connected in series with the motor across the battery. The electronic switching circuit 56 controls the application of power to the motor. The microcontroller 52 receives various feedback signals, including battery voltage, FET voltage, and battery current, from a feedback transducer circuit 60 and derives from these signals the desired duty cycle for the control signal supplied to the drive circuit 54 to drive the motor, and hence the cutting blade, at the desired speed, herein 3000 rpm.

Figure 3:
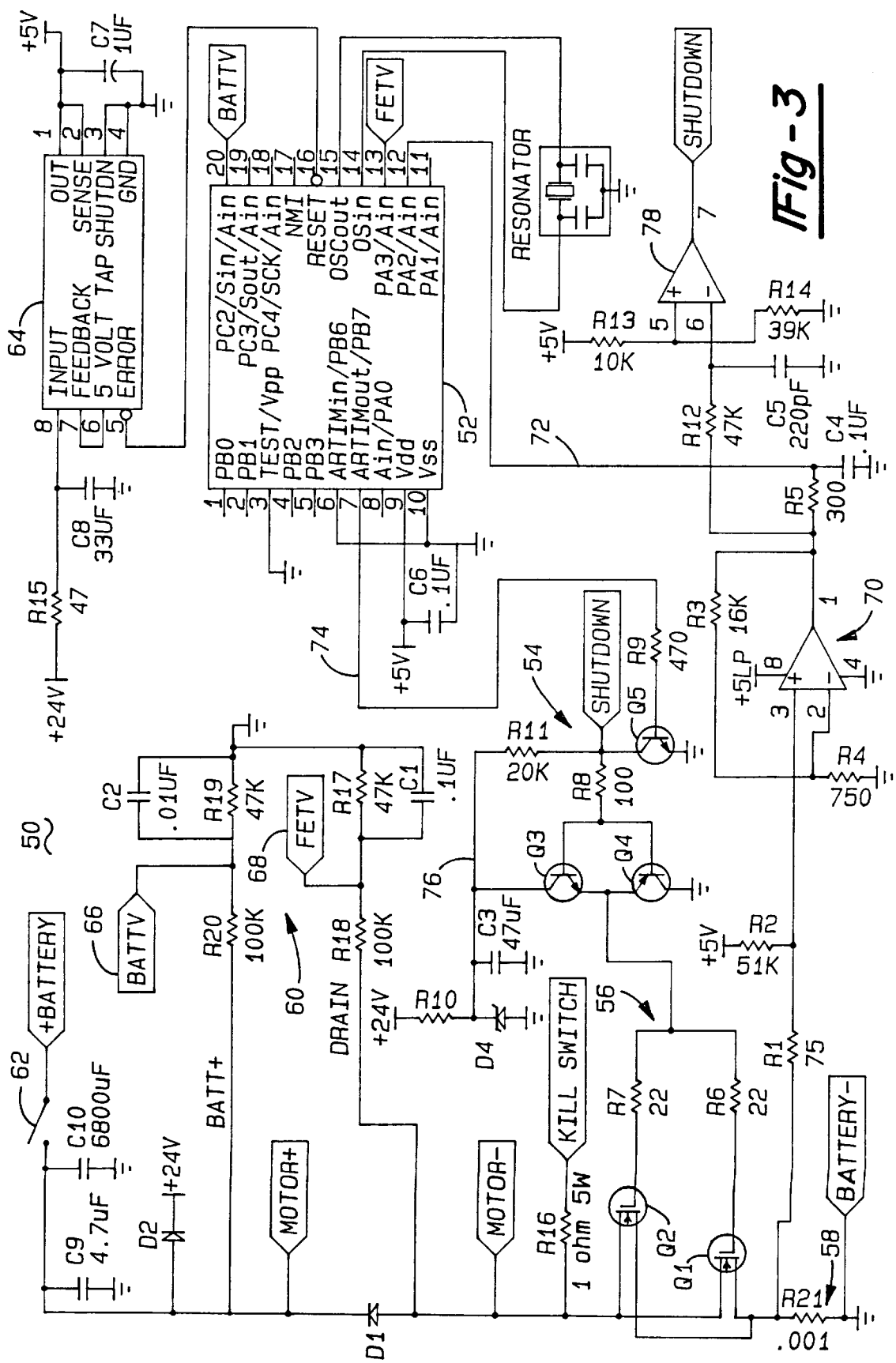
FIG. 3 is a circuit diagram of the motor control circuit according to the present invention.
Figure 6:
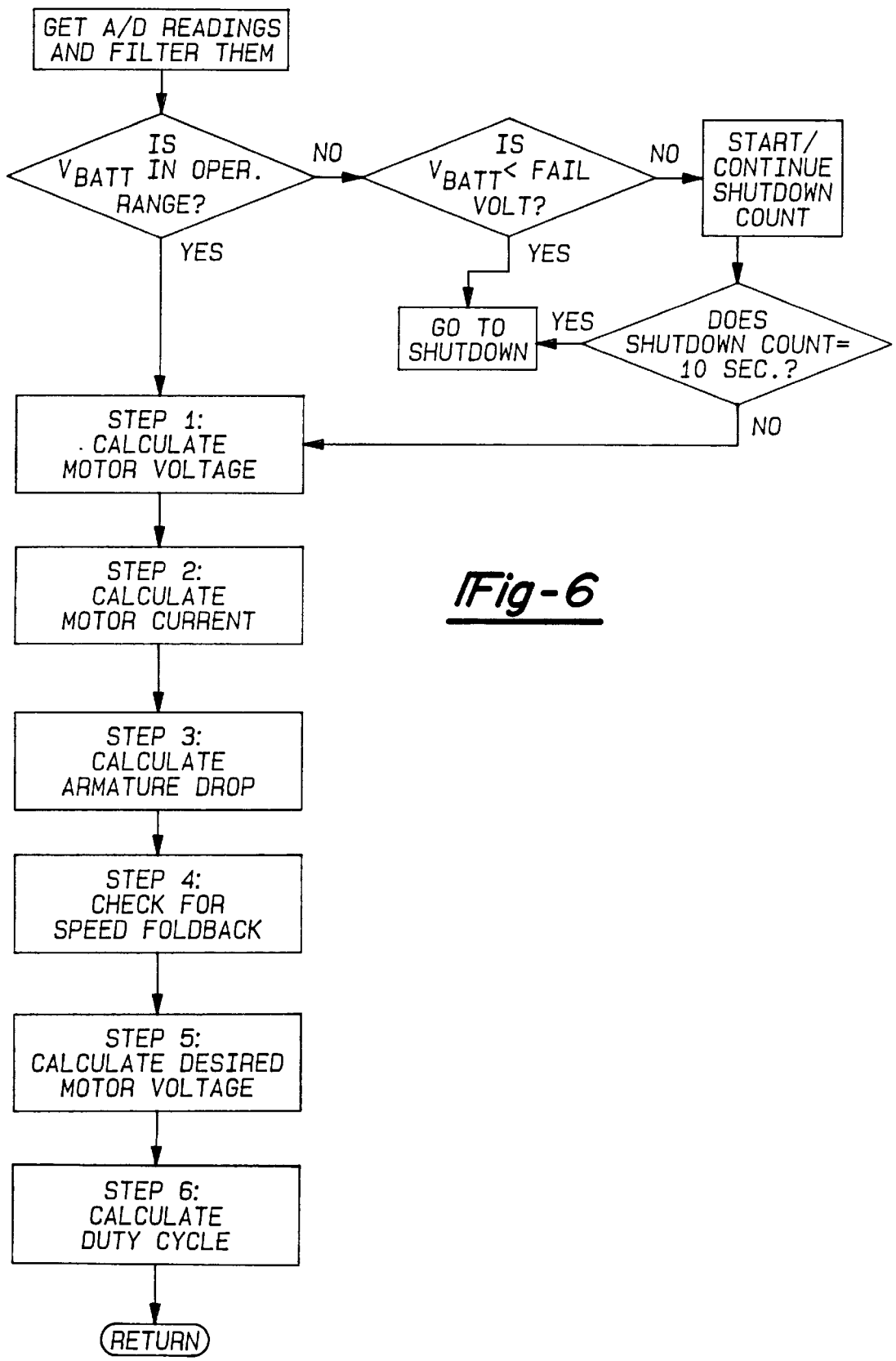

Referring now to FIG. 3, a circuit diagram of the preferred embodiment of the motor control circuit 50 according to the present invention is shown. As will readily be appreciated by those skilled in the art, other forms of motor control circuits for accomplishing the control function described herein may be used, such as a conventional proportional-integral (PI) or proportional-integral-derivative (PID) controller that directly senses actual motor speed with a speed transducer such as a tachogenerator, or indirectly senses motor speed from the back EMF of the motor. Optionally, a completely analog controller could also be used.

The microcontroller 52 used in the preferred embodiment comprises a 4-bit microprocessor with a built-in analog-to-digital converter. The microcontroller 52 is powered by a regulated 5-volt power supply 64 that is connected to the battery through an ON/OFF switch 62. The actual battery voltage at point 66 is sensed by a voltage divider network consisting of resistors R19 and R20, and supplied to an analog input port pin 20 of the microcontroller 52.

A D.C. permanent magnet motor (not shown) is connected directly to the battery through the ON/OFF switch 62. Energization of the motor is controlled by a pair of parallel-connected MOSFET power transistors Q1 an Q2 which, together with a current sensing resistor R21, are connected in series with the motor across the terminals of the battery. The MOSFET voltage at point 68 is sensed by another voltage divider network consisting of resistors R17 and R18, and supplied to an additional analog input port pin 13 of the microcontroller 52. A voltage signal from sense resistor R21 proportional to battery current is supplied to an amplifier circuit 70, which amplifies the voltage signal and supplies it through an RC filter circuit consisting of resistor R5 and capacitor C4, on line 72 to another analog input pin 12 of the microcontroller 52. The RC filter circuit serves to filter out the PWM switching frequency component of the sensed signal.

The microcontroller 52 is programmed to measure the battery voltage, MOSFET voltage, and battery current approximately every 20 milliseconds. These measurements are made using the analog-to-digital converter included with the microcontroller 52. As will be appreciated by those skilled in the art, this measurement step may include software filtering of the input signals. The duty cycle of the PWM control signal is derived in accordance with the following calculations:

1. Calculate motor voltage. The motor voltage is equal to the difference between the battery voltage minus the MOSFET voltage.

2. Calculate motor current. Motor current is not exactly equal to battery current in this application. However, it is presumed that the power drawn from the battery is equal to the power consumed by the motor. In other words, for purposes of this calculation, it is assumed that there are no losses in the control electronics. Therefore:

$$P_{MOTOR} = P_{BATT}$$

$$V_{MOTOR} * I_{MOTOR} = V_{BATT} * I_{BATT}$$

$$I_{MOTOR} = \frac{V_{BATT} * I_{BATT}}{V_{MOTOR}}$$

3. Calculate armature drop. The armature drop is the voltage drop across the motor due to the resistance in the motor armature. The armature drop is therefore equal to the armature resistance multiplied by the motor current. The value of armature resistance is a constant that is programmed into the memory of the microcontroller 52.

4. Calculate desired motor voltage. The desired motor voltage is equal to the reference speed voltage plus the armature drop voltage. The reference speed voltage is the theoretical motor voltage that would be required for the motor to rotate at the desired operating speed—e.g., 3000 rpm—with no load on the motor. Various reference speed voltages are also programmed into the memory of the microcontroller 52.

5. Calculate required duty cycle. The applied motor voltage is dependent upon the duty cycle of the MOSFETs Q1 and Q2 and the battery voltage. Accordingly, the required duty cycle can be calculated by dividing the desired motor voltage by the battery voltage.

The resulting calculated duty cycle signal is supplied on output line 74 from the microcontroller 52 at a modulation frequency of 7.8 KHz. This duty cycle output signal is supplied to the drive circuit 54, comprising transistors Q3, Q4, and Q5, which are connected via line 76 to a 12-volt regulated voltage supply consisting of resistor R10, zener diode D4, and capacitor C3. When transistor Q5 is turned off by the duty cycle control signal on line 74, transistor Q3 is turned on, transistor Q4 is turned off, and the power MOSFETs Q1 and Q2 are turned on, thereby energizing the motor. Conversely, when transistor Q5 is turned on by the duty cycle control signal on line 74, transistor Q3 is turned off, transistor Q4 is turned on, and the power MOSFETs Q1 and Q2 are turned off, thereby interrupting power to the motor. Note, transistor Q4 serves to discharge the gate-source capacitance of the MOSFETs Q1 and Q2 to ensure that the MOSFETs Q1 and Q2 are turned off. Accordingly, the duty cycle of the MOSFETs Q1 and Q2 is controlled by the microcontroller 52 to regulate the speed of the motor over a wide range of load conditions to conserve the energy of the battery. Thus, for example, when the mower passes over already cut grass, driveways, or sidewalks, or is pivoted on its rear wheels to turn the mower, thereby substantially unloading the motor, the present controller regulates the speed of the motor to a lower than maximum speed, herein 3000 rpm, to reduce the amount of energy consumed by the motor. Moreover, even while cutting moderate levels of grass, the speed of the motor, and hence the speed of the cutting blade, is regulated to 3000 rpm. In this manner, the energy expended is limited to the minimum amount necessary to achieve good cutting results.

Under certain circumstances, such as when the blade of the mower abruptly decelerates when striking an object, the current drawn by the motor may rapidly surge to a very high level. To protect the motor and the MOSFETs Q1 and Q2 and to prevent this condition from excessively draining the battery, the present control circuit 50 also includes a current cutoff circuit. In particular, the battery current feedback signal from the output of amplifier circuit 70 is additionally provided through a time delay circuit consisting of resistor R12 and capacitor C5 to the negative input of a comparator amplifier 78. The values of resistor R12 and capacitor C5 are selected to provide a relatively fast time delay of 20 μsec. The positive input of comparator 78 is connected to a resistor divider network consisting of resistors R13 and R14 that serve to provide a threshold voltage signal corresponding to approximately 100 amperes. Accordingly, whenever the sensed battery voltage signal from amplifier circuit 70 surges above the level corresponding to approximately 100 amperes for longer than 20 μsec., the output of comparator 78 switches from a HI to a LO state, thereby turning off transistor Q3, turning on transistor Q4, and turning off the MOSFETs Q1 and Q2. Thus, power to the motor is interrupted and possible damage to the control circuit 50 is avoided.

Turning now to FIGS. 4–8, flowcharts of the operating program of the microcontroller 52 are shown. Referring to the Main Program illustrated in FIG. 4, when the ON/OFF switch is actuated, the control circuit is energized and the microcontroller 52 is initialized. The initialization routine, which is set forth in FIG. 5, includes the initialization of all registers, timers, and interrupts, and the resetting of the fault circuit. The battery voltage is then checked to ensure that the battery is charged sufficiently to operate the mower. In the preferred embodiment this equates to a battery voltage greater than 19.2 volts. Assuming the battery is properly charged, the program proceeds to the Motor Control routine shown in FIG. 6.

The Motor Control routine calculates the duty cycle of the PWM control signal supplied to the MOSFETs Q1 and Q2. At the outset, the microcontroller 52 measures the various operating parameters, namely battery voltage and current and MOSFET voltage, supplied to its analog input ports by the feedback transducer circuit 60. These analog signals are converted to digital signals and filtered using well known averaging techniques. The program then checks the battery voltage again to ensure that it is still within the appropriate operating range, namely greater than 19.2 volts. If the battery voltage is below 19.2 volts, the program checks to see if the battery voltage is less than a preset fail voltage, herein 16 volts. If below the fail voltage level, the program branches directly to the Shutdown routine which immediately turns off the MOSFETs Q1 and Q2 and de-energized the motor. If, however, the battery voltage is not below 16 volts, a shutdown counter is initiated. If the battery voltage remains below the reset minimum operating range voltage of 19.2 volts for 10 seconds, then the Shutdown routine is entered.

Figure 7:
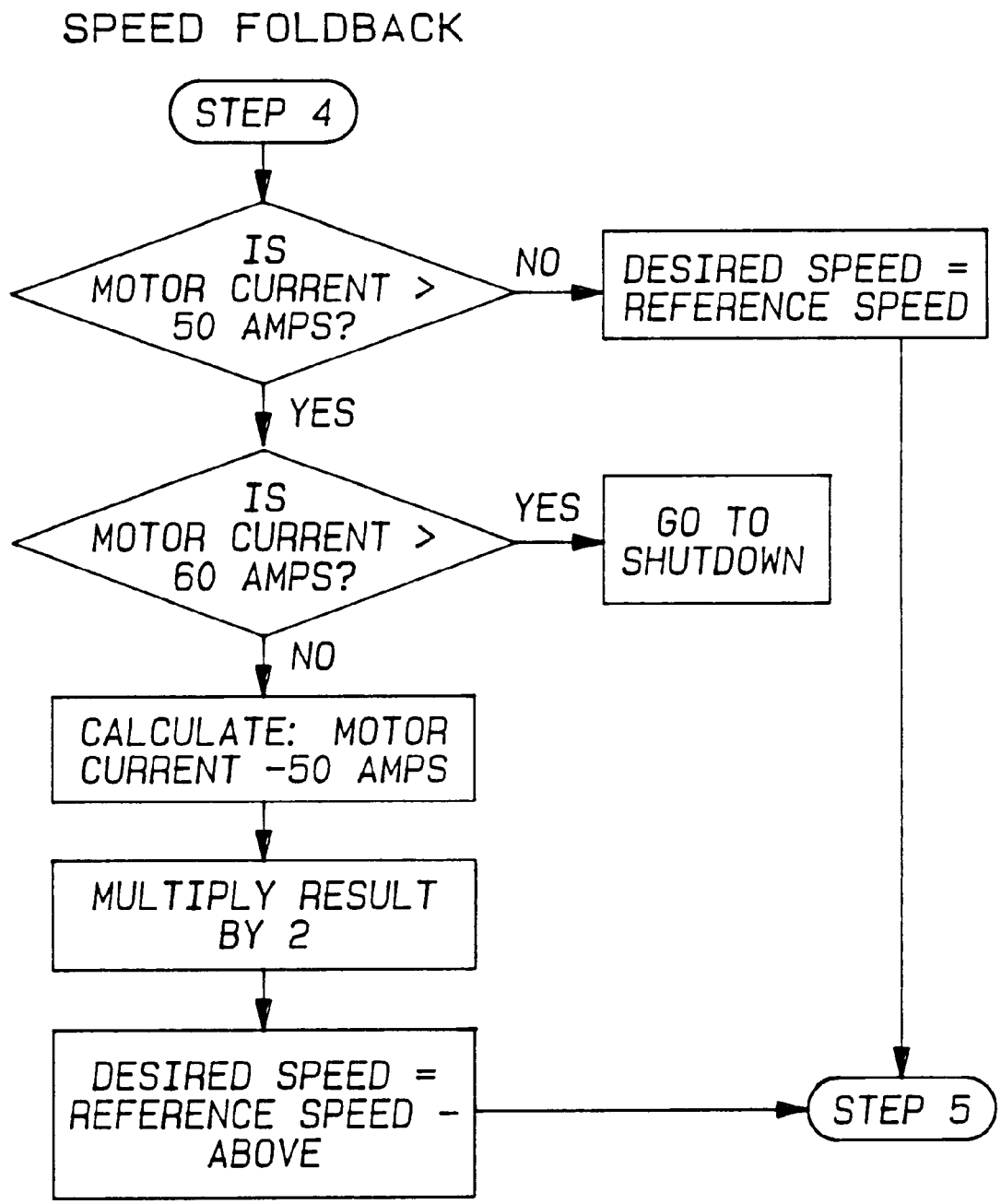

Assuming the battery is properly charged, the program proceeds through the steps described above for calculating from the monitored parameters the duty cycle of the PWM control signal required to maintain the speed of the motor at the desired reference speed of 3000 rpm. In particular, the microcontroller in step 1 calculates motor voltage, in step 2 calculates motor current, and in step 3 calculates the voltage drop across the armature of the motor. In step 4 the microcontroller checks to determine whether the battery current is above a predetermined current limit selected to prevent excessive battery drain. This step is referred to in the flowchart as the Speed Foldback routine and is illustrated in FIG. 7. The Speed Foldback routine is intended for heavy loading conditions, such as when the mower encounters very tall grass. Such conditions can cause the current drawn by the motor to increase dramatically. As previously noted, when current draw rises to high levels, the efficiency of the battery diminishes significantly, thereby sharply reducing the total run time of the mower. Accordingly, it is desirable from an overall efficiency standpoint to limit the level of battery current. To accomplish this, the microcontroller is programmed to reduce the desired motor voltage so that the battery current does not exceed a prescribed maximum limit. In other words, under very heavy loading conditions, the speed of the motor is permitted to drop below the desired 3000 rpm level.

With particular reference to FIG. 7, the microcontroller in the Speed Foldback routine initially checks to see if the motor current is greater than 50 amps. If motor current is less than 50 amps, the motor speed is kept at the desired reference speed of 3000 rpm and the Motor Control routine proceeds to step 5. However, if motor current is greater than 50 amps, the program then checks to see if motor current is greater than 60 amps, which in the preferred embodiment represents the maximum allowable current level. Due to the software filtering in the analog-to-digital conversion process, the motor current must be above 60 amps for approximately one-half second before the program will jump at this point to the Shutdown routine.

Assuming motor current is greater than 50 amps, but less than 60 amps, the microcontroller then calculates a desired motor speed that effectively reduces by approximately 100 rpm the resulting speed of the motor for each ampere of motor current over 50 amps. For example, if motor current is 52 amps, motor speed is reduced to approximately 2800 rpm. If motor speed current is 54 amps, motor speed is reduced to approximately 2600 rpm, and so on. Once the revised desired motor speed is established, the program returns to step 5 in the Motor Control routine where the desired motor voltage is calculated. In step 6, the appropriate duty cycle for the PWM control signal is calculated.

Returning to the Main program, the microcontroller 52 thereupon generates the PWM control signal having the newly calculated duty cycle. The microcontroller repeats this control process approximately every 20 milliseconds.

Figure 8:
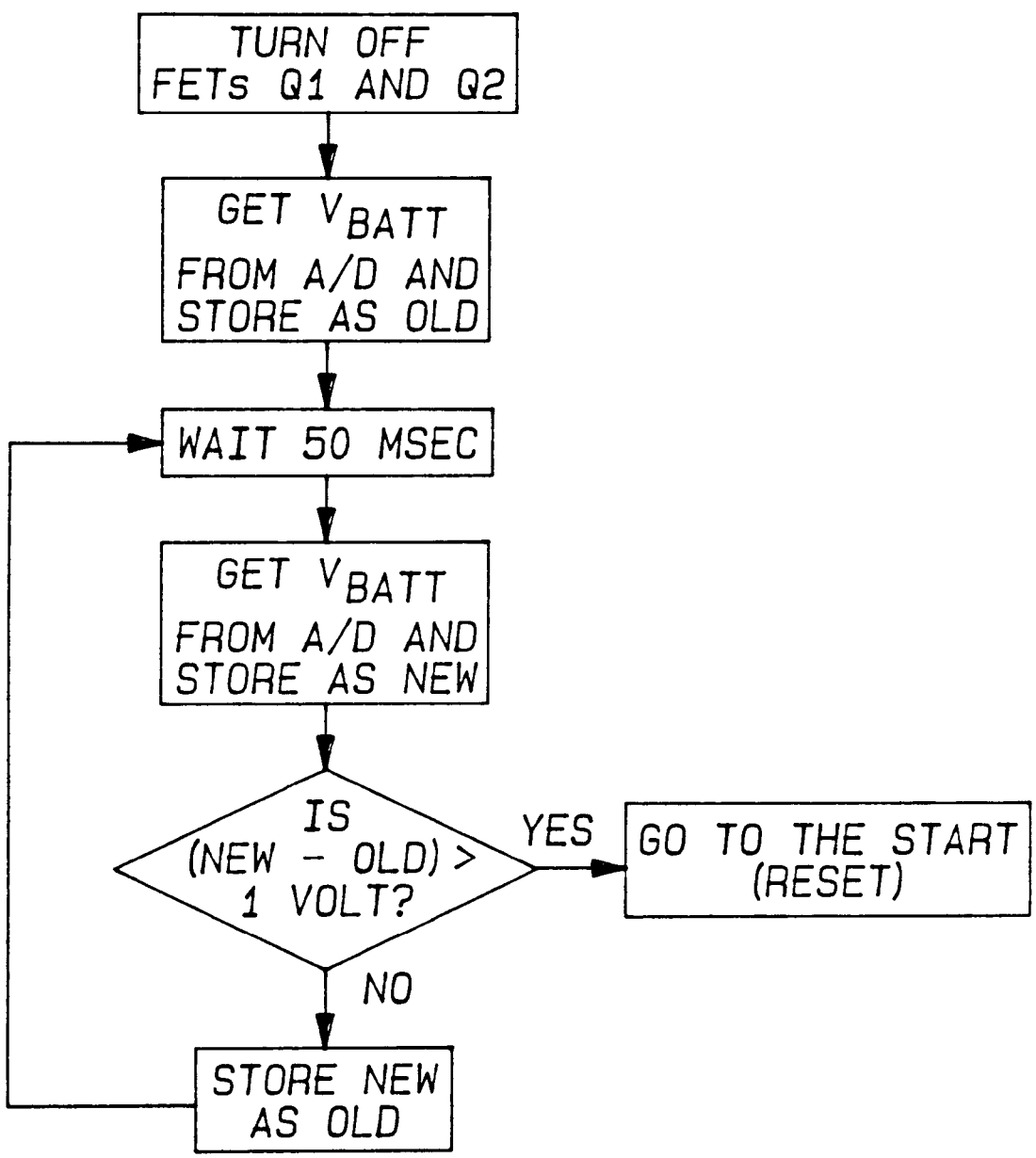

Turning now to FIG. 8, the microcontroller enters the Shutdown routine from the Main Control routine or the Speed Foldback routine as described above and whenever the ON/OFF power switch is released. Upon entering the Shutdown routine, the power to the motor is immediately interrupted by turning off the MOSFETs Q1 and Q2. The microcontroller then takes a first battery voltage reading, waits 50 milliseconds, takes a second battery voltage reading, and then subtracts the first reading from the second reading. If the battery voltage has increased by more than 1 volt over the 50 millisecond interval, the microcontroller returns to the start of the Main program. Otherwise, the process is repeated. The purpose of this exercise is as follows.

When the program enters the Shutdown routine due to a battery failure or a current overload condition, it is desirable to ensure that the operator has turned off the power switch to reset the system before normal operation is resumed. However, due to the high capacitance in the control circuit, particularly from capacitor C10, the control circuit will remain energized for at least five seconds after the power switch has been turned off. Therefore, the controller cannot reliably determine whether the power switch has been turned off simply by looking for a very low battery voltage signal. Moreover, it is undesirable to require the operator to wait for over five seconds after turning off the power switch following a temporary current overload before being able to restart the mower.

Accordingly, a control scheme is needed that will permit the microcontroller to reliably determine during this ambiguity period whether the power switch has been properly turned off for at least one-half second before being turned back on. This is accomplished in the preferred embodiment by checking the rate of change of the battery voltage signal. In particular, if the Shutdown routine is entered due to a current overload condition and the power switch is not turned off, the battery voltage will either remain substantially constant or gradually diminish. However, if the power switch has been turned off for at least one-half second, giving the battery an opportunity to partially recover, the battery voltage will temporarily rise at a rate greater than 1 volt/50 milliseconds following re-actuation of the power switch. Under these circumstances, the control circuit will permit the operator to restart the mower. Of course, if the condition which initially gave rise to the current overload condition persists, the program will again branch to the Shutdown routine. Obviously, if the Shutdown routine is entered in response to the power switch being turned off, the circuit capacitance will gradually discharge, thereby never satisfying the rising battery voltage criteria required to branch out of the Shutdown routine and the system will simply shut down.

Figure 9:
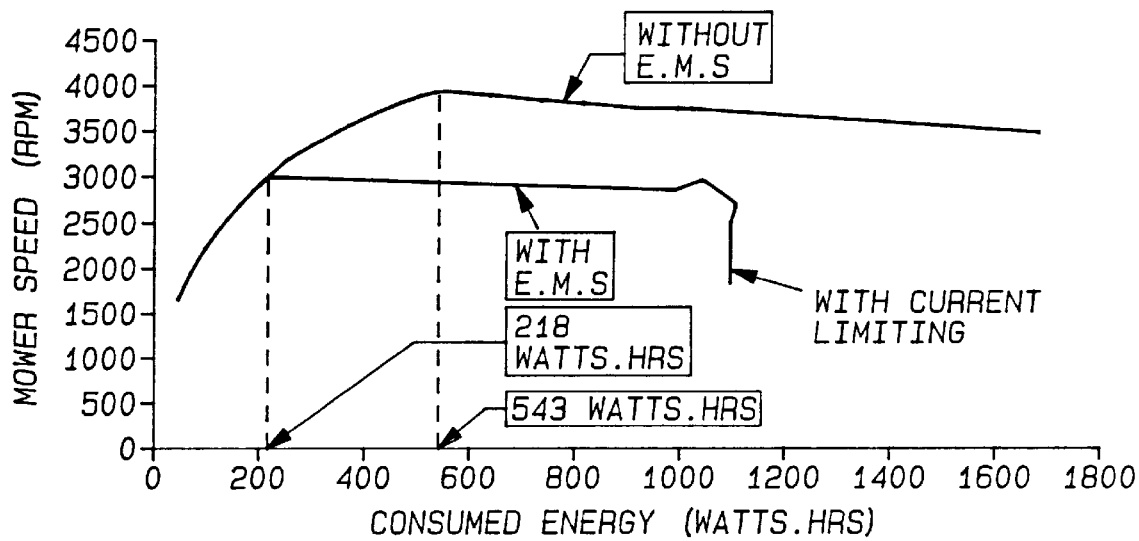
FIG. 9 is a graph comparing the speed of the cutting blade of the mower according to the present invention and the speed of the cutting blade in a convention unregulated mower.

Referring now to FIG. 9, a speed versus consumed energy graph is illustrated comparing the speed of the cutting blade in a conventional mower with the speed of the cutting blade in the mower according to the present invention. As can be seen from the diagram, a conventional mower typically drives the cutting blade at a no-load speed of approximately 3800–4000 rpm and the speed of the cutting blade gradually drops to approximately 3500 rpm as loading on the mower increases. Accordingly, blade speed is maintained within an optimum range that produces excellent cutting results. The mower equipped with the energy management system according to the present invention regulates the speed of motor so that the cutting blade rotates at a substantially constant speed, preferably within the range of approximately 2800–3200 rpm. Moreover, if the motor is loaded to the point where consumed energy approaches approximately 1100 watts, the speed of the cutting blade is gradually reduced below the regulated speed to prevent excessive battery drain. Consequently, it can be seen that the present mower maintains the cutting blade speed at a level that produces good cutting results without consuming excessive levels of power. As will be appreciated by those skilled in the art, substantial efficiencies can be gained according to the teachings of the present invention by regulating the speed of the cutting blade within the range of approximately 2800–3200 rpm. This cutting blade speed range produces good cutting results at significantly reduced energy consumption levels over a wide range of loading conditions when compared to conventional unregulated mowers.

Figure 10:
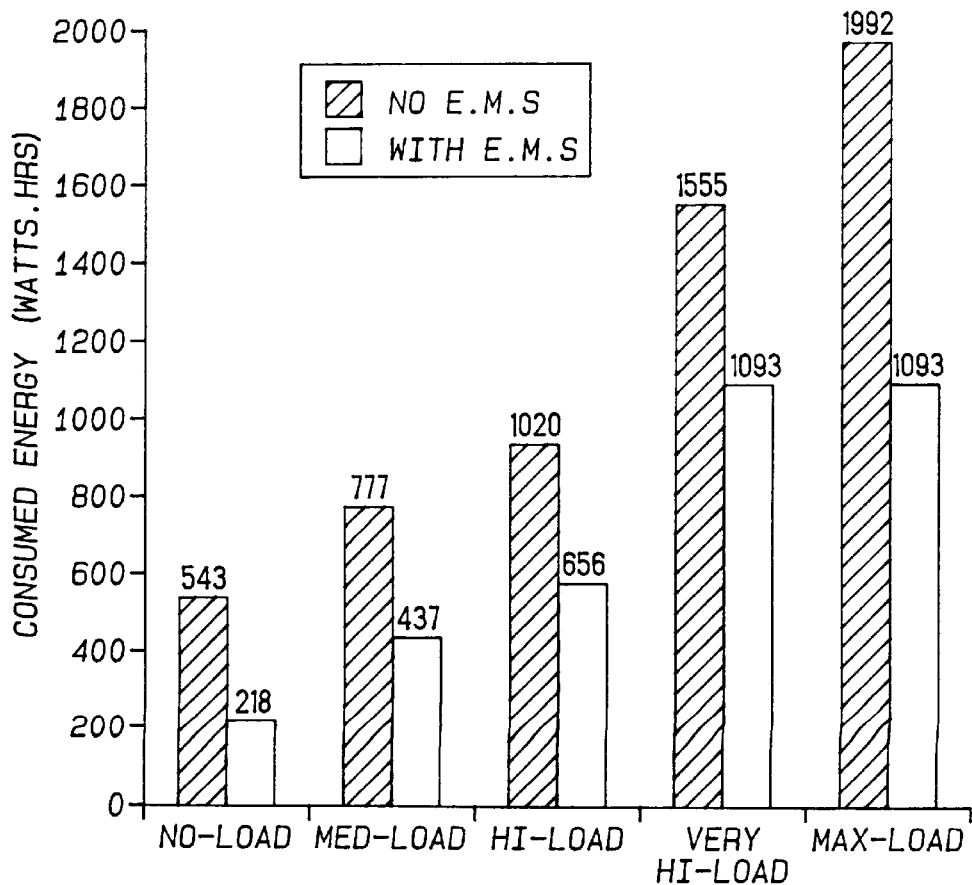
FIG. 10 is a chart comparing the energy consumed by the present mower and a conventional mower under various loading conditions.

This result is graphically illustrated in FIG. 10 which illustrates a chart comparing the energy consumed under various loading conditions by a mower having a controller with the energy management system according to the present invention and a conventional unregulated mower. As can be seen from the diagram, the present invention achieves substantial energy savings and therefore enhanced operating efficiency over the entire range of loading conditions. Moreover, it is significant to note that even under medium to no-load operating conditions, which can frequently account from a majority of the mower's operating time, substantial energy savings are realized. Accordingly, the total run time of the mower on a single battery charge is significantly extended.

Figure 11:
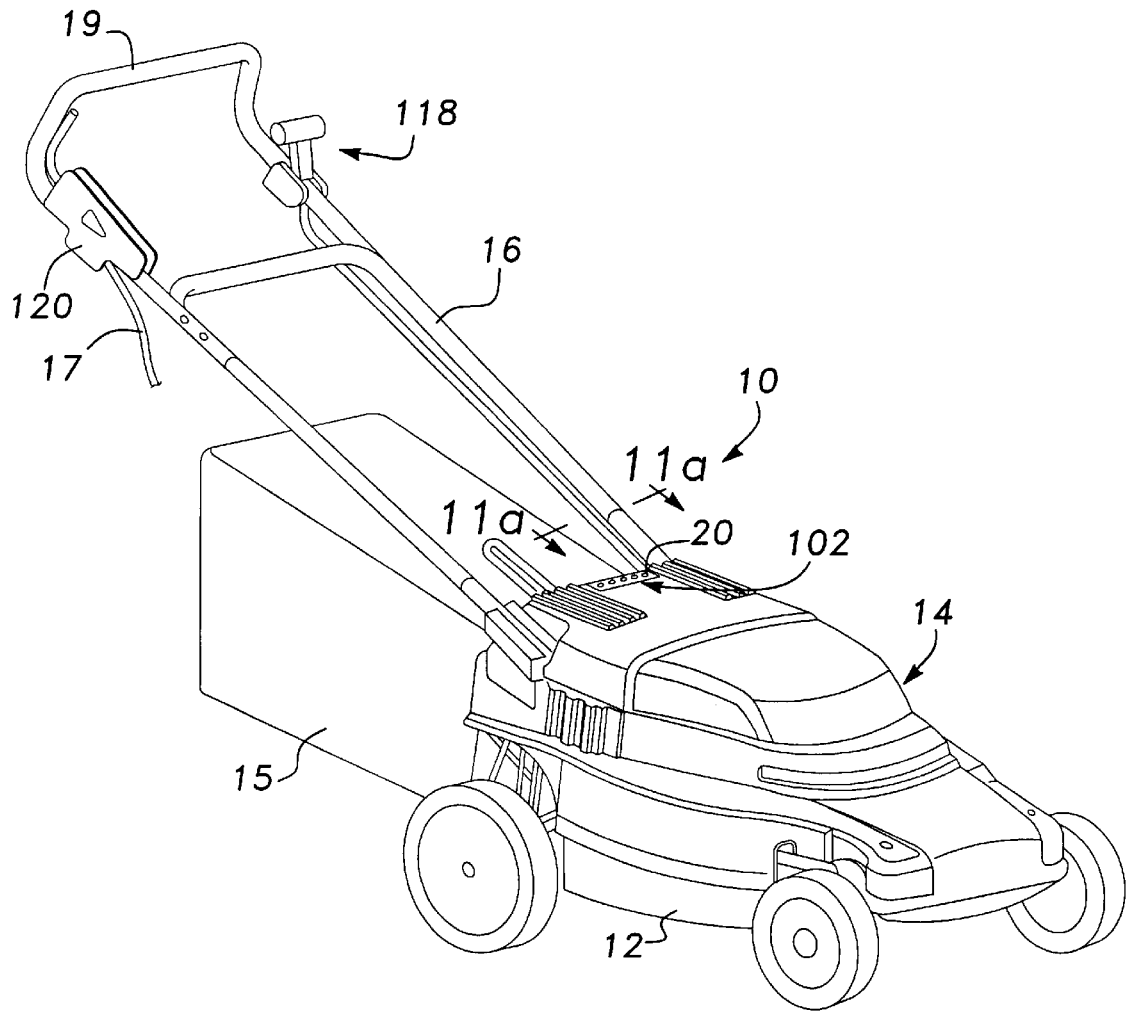
FIG. 11 is a perspective view of a cordless electric lawn mower of the general type to which an alternative preferred embodiment of the present invention pertains.
Figure 11A:
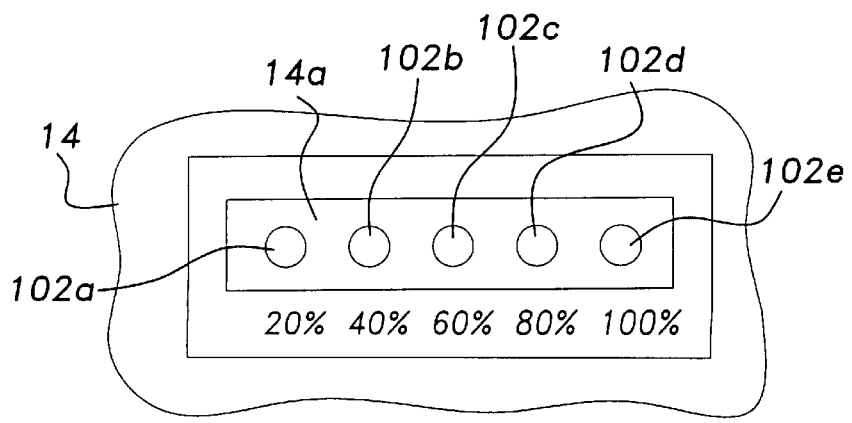
FIG. 11a is a perspective view of a portion of the shroud of the mower in FIG. 11 showing even more clearly the LED display.

Referring now to FIG. 11, a cordless electric lawn mower 100 is shown incorporating an energy management control system in accordance with an alternative preferred embodiment of the present invention. The cordless electric lawn mower 100 is identical to the lawn mower 10 shown in FIG. 1 with the exception of a user adjustable throttle control 118 for controlling the speed of a blade motor mounted under shroud 14 of the mower 100, and an LED display 102 mounted under the shroud 14. With brief reference to FIG. 11, the LED display 102 includes a plurality of LEDs 102a–102e for indicating to the user the approximate state-of-charge of the battery. The shroud 14 includes suitably sized openings which allow the LEDs to protrude through so as to be readily visible to the user. Optionally, but preferably, a decal or other form of indicia 14a is placed near the LEDs to indicate to the user the state-of-charge corresponding to the illumination of various ones of the LEDs 102a–102e. It will be appreciated immediately that each of these components could be located in other positions if desired. For example, the LED display 102 could be positioned remote from the shroud 14 such as somewhere along the handle 16.

Figure 12:
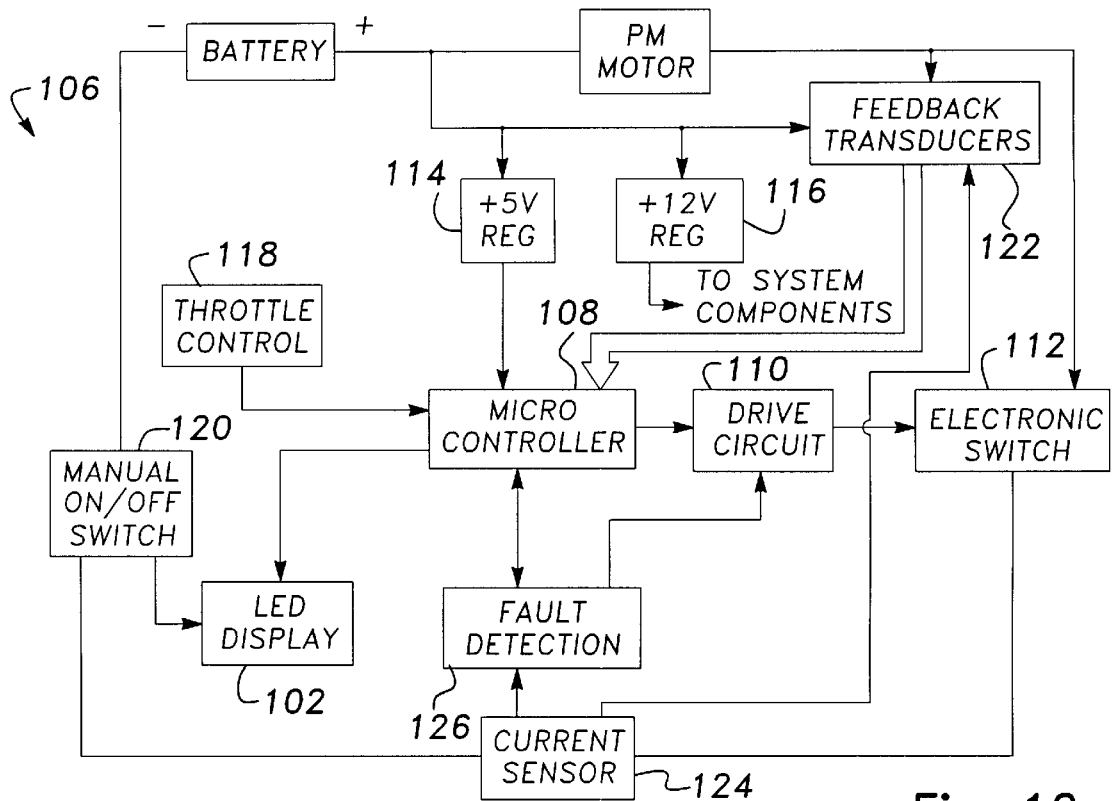
FIG. 12 is a simplified block diagram of a motor control circuit in accordance with an alternative preferred embodiment of the present invention.

Referring now to FIG. 12, a simplified block diagram of an energy management system 106 in accordance with an alternative preferred embodiment of the present invention is shown. The energy management system 106 generally includes a microcontroller 108 which includes an internal pulse-width-modulation (PWM) generator circuit and an A/D converter. The PWM generator circuit is used for generating a PWM control signal which is applied to a drive circuit 110. The drive circuit 110 in turn controls an electronic switching circuit 112. The microcontroller 108 receives its +5 volt supply signal from a +5 volt regulator 114. A second regulator 116 supplies +12 volts to the various components of the system 106.

The user adjustable throttle control 118 provides a baseline or reference signal to the microcontroller 108 which is representative of a desired cutting blade speed at which the blade motor is to be operated. A manual on/off switch 120 enables the user to turn on and off the system 106. When in the "on" position, the switch 120 provides power directly from the battery to the LED display 102. It will be appreciated that the system also preferably includes the electromechanical interlock switch described in U.S. Pat. No. 5,085,043, mentioned hereinbefore, which is also hereby incorporated by reference herein.

The LED display 102 also receives signals from the microcontroller 108 representative of the present state-of-charge of the battery. The LED display 102 displays to the user the current state-of-charge of the battery as a percentage of full charge. Although the display 102 could include a greater or lesser number of elements, in the presently preferred embodiment five LEDs 102a–103e are provided for indicating to the user battery charge levels of 20%, 40%, 60%, 80%, and 100%. Full charge would be indicated by all of the LEDs being illuminated. When the state-of-charge drops to 80 %, only four LEDs would be illuminated. When the state-of-charge of the battery drops to about 60 %, only three LEDs would be illuminated, and so on.

A plurality of feedback transducers 122 receive a current signal from a current sensing circuit 124 and a battery voltage signal, and transmit representative electrical signals to the microcontroller 108. A fault detection circuit 126 monitors the current flowing to the motor and turns off the electronic switching circuit 112 in the event a sudden, sharp increase in current exceeds a pre-determined maximum upper limit, which, in the preferred embodiment is about 150 amps. The fault detection circuit 126 also informs the microcontroller 108 of this condition and maintains the electronic switching circuit 112 in an off condition until the fault detection circuit 126 is reset by the microcontroller 108.

Figure 13A:
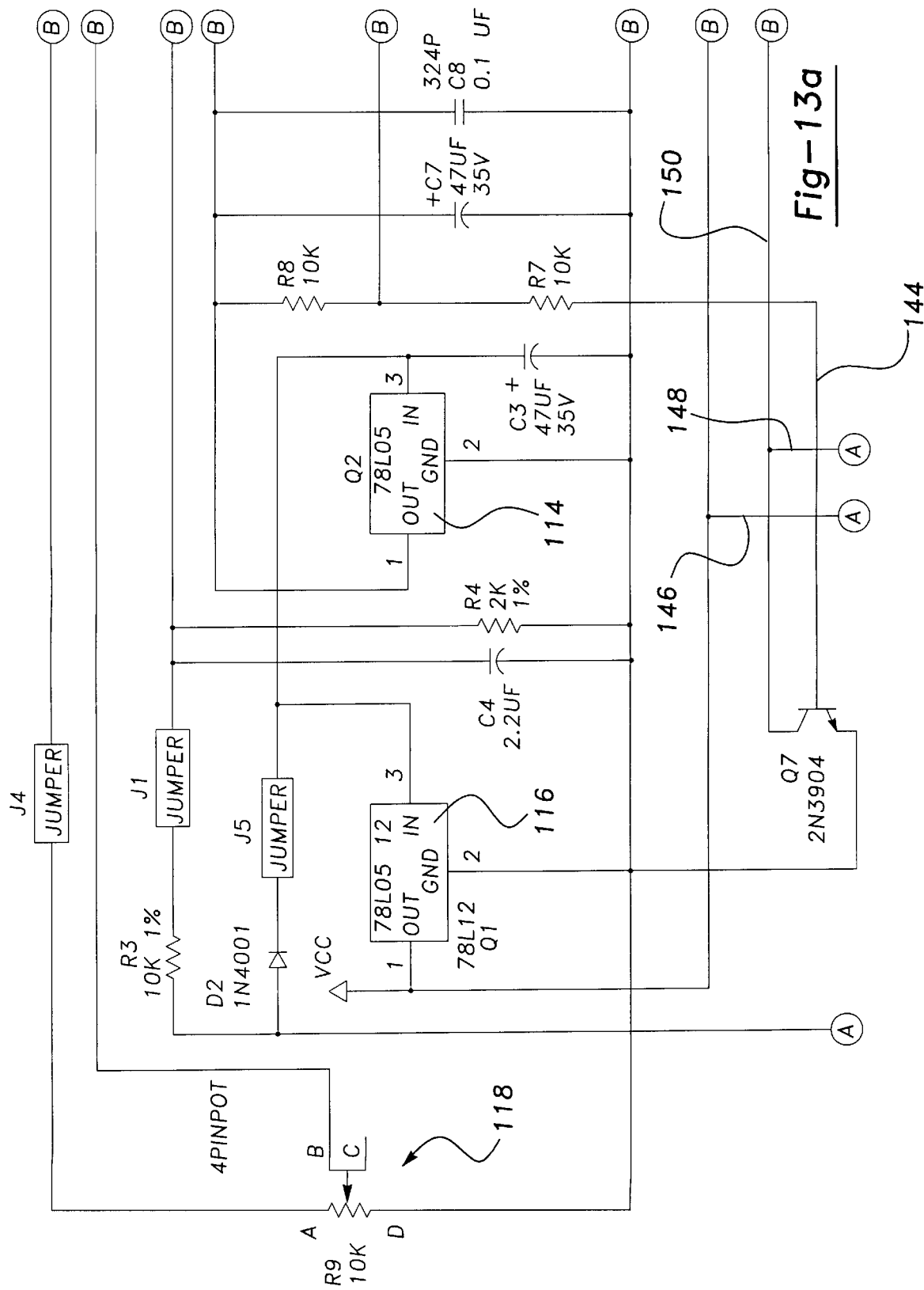
FIGS. 13a–13e are electrical schematic diagrams of the motor control circuit of the system.

Turning now to FIGS. 13a–13e, a schematic representation of the major components of the energy management system 106 of the present invention is shown. Referring specifically to FIG. 13a, the user adjustable throttle control 118 allows the user to set a desired blade speed from anywhere between about 2000 rpm to about 3800 rpm. Two thousand rpm represents the anticipated lowest blade motor speed at which acceptable cutting results can be expected. Thirty-eight hundred rpm represents the highest anticipated blade motor speed which would be needed for heavy cutting jobs such as cutting through tall grass, weeds, etc. It will be appreciated, however, that this range of blade motor speeds could be modified slightly if needed to accommodate extremely light or extremely heavy cutting needs. For example, if it is known that mower will be used in an area where the majority of cutting will be extremely light cutting, then the lower limit could be set even lower than 2000 rpm. Conversely, if it is known that the mower will be used in a geographic region where cutting is extremely heavy, then the upper 3800 rpm limit could be raised slightly. Of course, these values would have to be programmed into the system 106 during calibration.

Figure 13B:
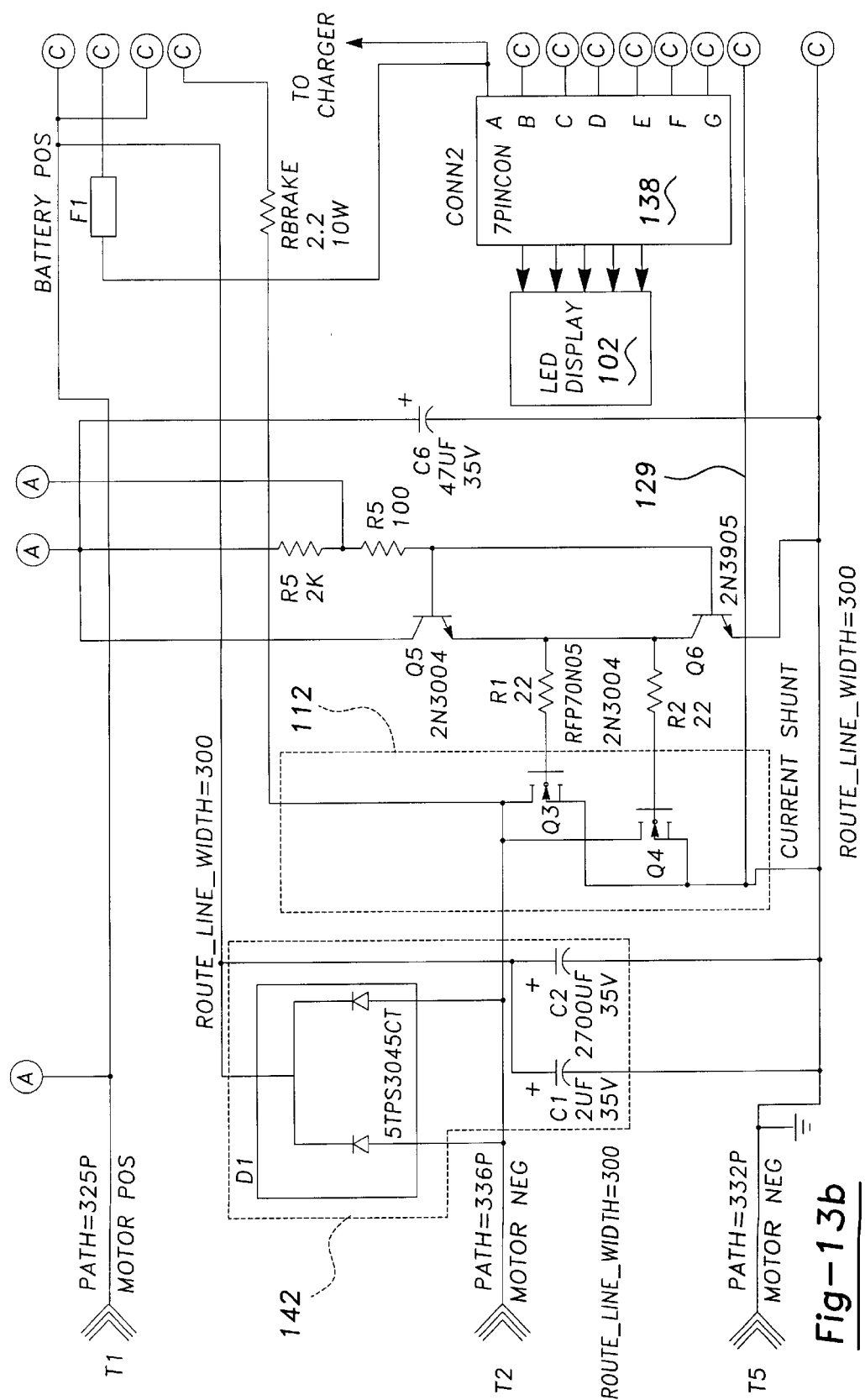
Figure 13C:
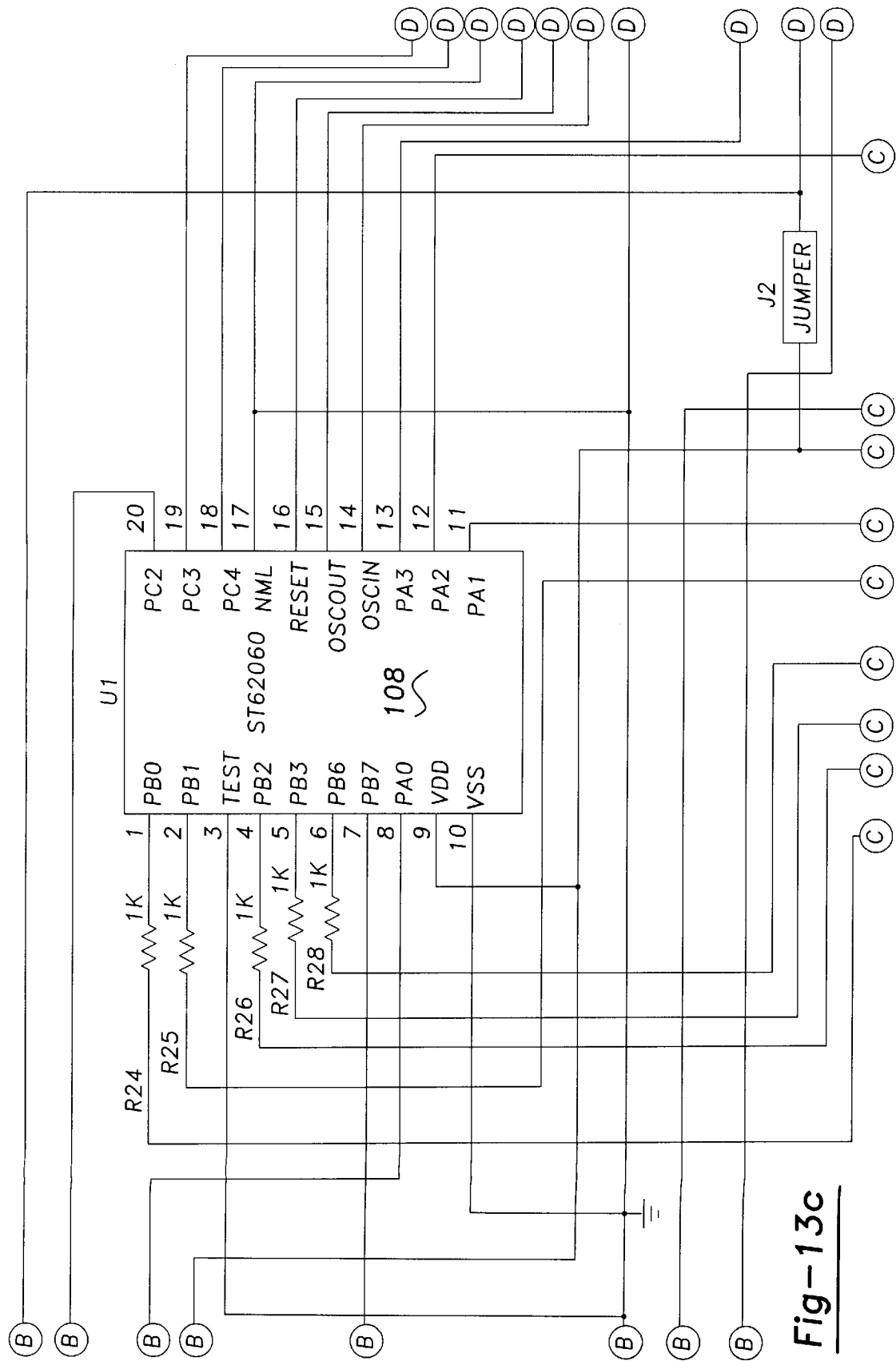

Referring to FIG. 13c, the signal from the throttle control 118 is input to pin 20 of the microcontroller 108. The microcontroller (FIG. 13c) 108 is an 8-bit microcontroller operating at 7.8 MHz. Its internal A/D convertor converts the analog signal from the throttle control 118 received on pin 20 thereof into a corresponding digital signal. The microcontroller 108 communicates with the fault detection circuit 126 (FIG. 13e) via pin 11 and pin 13. The fault detection circuit 126 includes an op amp 128 configured as a comparator (U2A) which has its output coupled to the collector of transistor Q7 and between resistors R5 and R6, which in turn form a voltage divider network.

Figure 13D:
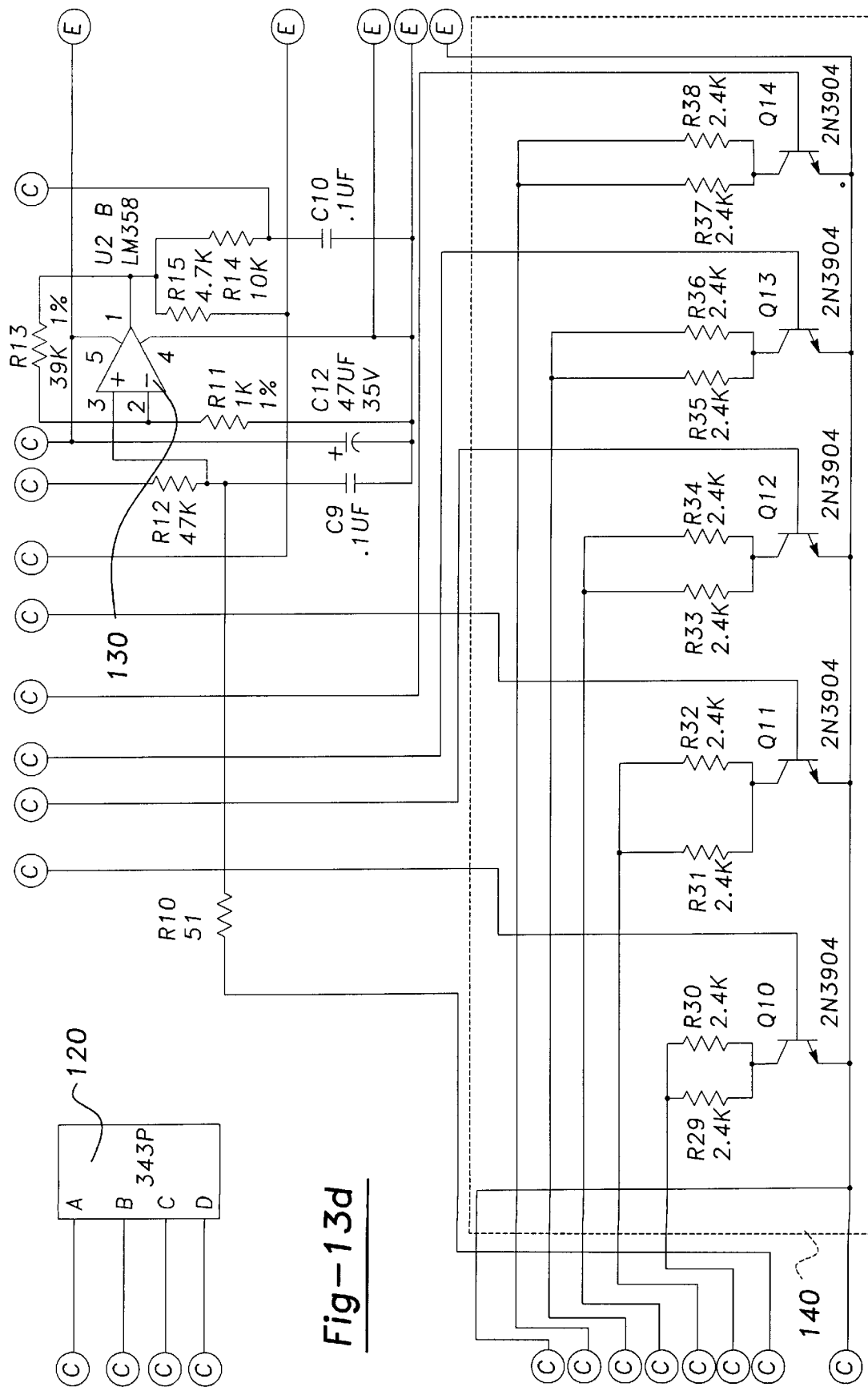

With reference to FIG. 13b, the instantaneous current drawn by the motor is monitored via circuit line 129, which forms a current shunt, by op amp 130 at its negative input (FIG. 13d). The signal on the positive input of the amplifier 130 is a reference signal which sets up a threshold current value. The amplifier 130 amplifies the difference between these signals and provides an output through resistors R15 and R14. The signal through resistor R14 is input to pin 12 of the microcontroller 108 to provide the microcontroller with a feedback signal representative of the instantaneous current being drawn by the motor at any given time. R14 and capacitor C10 (FIG. 13d) together form a filter for providing a smooth current signal to pin 12. R15 and capacitor C11 also form a faster acting filter which filters the current signal applied to the negative input of op amp 128. The function of these two circuits will be described in greater detail momentarily.

The energy management system 106 also includes a resonator 132 (FIG. 13e) for providing a 7.8 megahertz clock signal to the microcontroller 108. A connector 134 allows an external calibration computer 136 to be coupled to the microcontroller 108 via a serial communications interface for programming various variables into an electrically erasable, programmable, read only memory (EEPROM) of the microcontroller 108. It will be appreciated, however, that the calibration computer 136 does not form a portion of the energy management system 106. Transistor Q9 functions in connection with zener diode D5, to maintain the microcontroller 108 turned off until the +5 volt supply 114 increases to a suitable voltage after the system 106 is first turned on. Once the break-over voltage of zener D5 is reached, Q9 turns on, causing a reset signal to be applied to pin 16 of the microcontroller 108.

Referring to FIG. 13b, a second connector 138 is used to couple the LED display 102 to a transistor network 140 (FIG. 13d). The transistor network 140 is used to controllably turn on and off each LED 102a–102e of the LED display 102 in accordance with the state-of-charge of the battery, as determined by the microcontroller 108. The connector 138 also allows an external battery charger to be coupled to the battery through the manual on/off switch 120 (FIG. 13d). It will be noted that even when the on/off switch 120 is in its off state, a path exists for providing a charging current to the positive terminal of the battery.

The on/off switch 120 includes four inputs A, B, C and D. When in the OFF position, inputs C and D are bridged or coupled together. When in the ON position, inputs A and B are coupled together. In the ON position, the positive terminal of the battery applies full battery voltage to the positive terminal of the motor. When in the OFF position (inputs C and D coupled together), the positive terminal of the battery is coupled through a length of resistive wire, represented by $R_{brake}$, to the negative terminal of the motor to enable a well known dynamic braking action to bring the motor to a relatively quick stop once the switch 120 is released by the user into the OFF position.

Referring to FIG. 13b, the electronic switching circuit 112 includes MOSFET's Q3 and Q4 which are turned on and off by transistors Q5 and Q6. When MOSFET's Q3 and Q4 are turned off, diode D1 and capacitors C1 and C2 form a "snubber" circuit to help absorb energy at the instant that the MOSFET's Q3 and Q4 transition to the off state. Although diode D1 is a fast-acting diode, it does not act quite fast enough to dissipate the instantaneous energy at the motor negative terminal. Capacitor C1 is a 2 microfarad, metallized polypropylene capacitor which has a low equivalent series resistance and therefore absorbs a great deal of the instantaneous energy when the MOSFET's Q3 and Q4 transition to the off state. Capacitor C2, being a 2700 microfarad capacitor, has a slightly higher equivalent series resistance and also begins to charge after C1 has begun charging but before C1 is fully charged.

Transistors Q5 and Q6 are turned on and off in accordance with the operation of transistor Q7 (FIG. 13a). When transistor Q7 is off, transistors Q5 and Q6 are forward biased, which provides the gate drive signals for the gates of MOSFET's Q3 and Q4. When Q7 is turned on, the base drive signal provided to transistors Q5 and Q6 via line 146 is shorted to ground by Q7 via line 148.

Figure 13E:
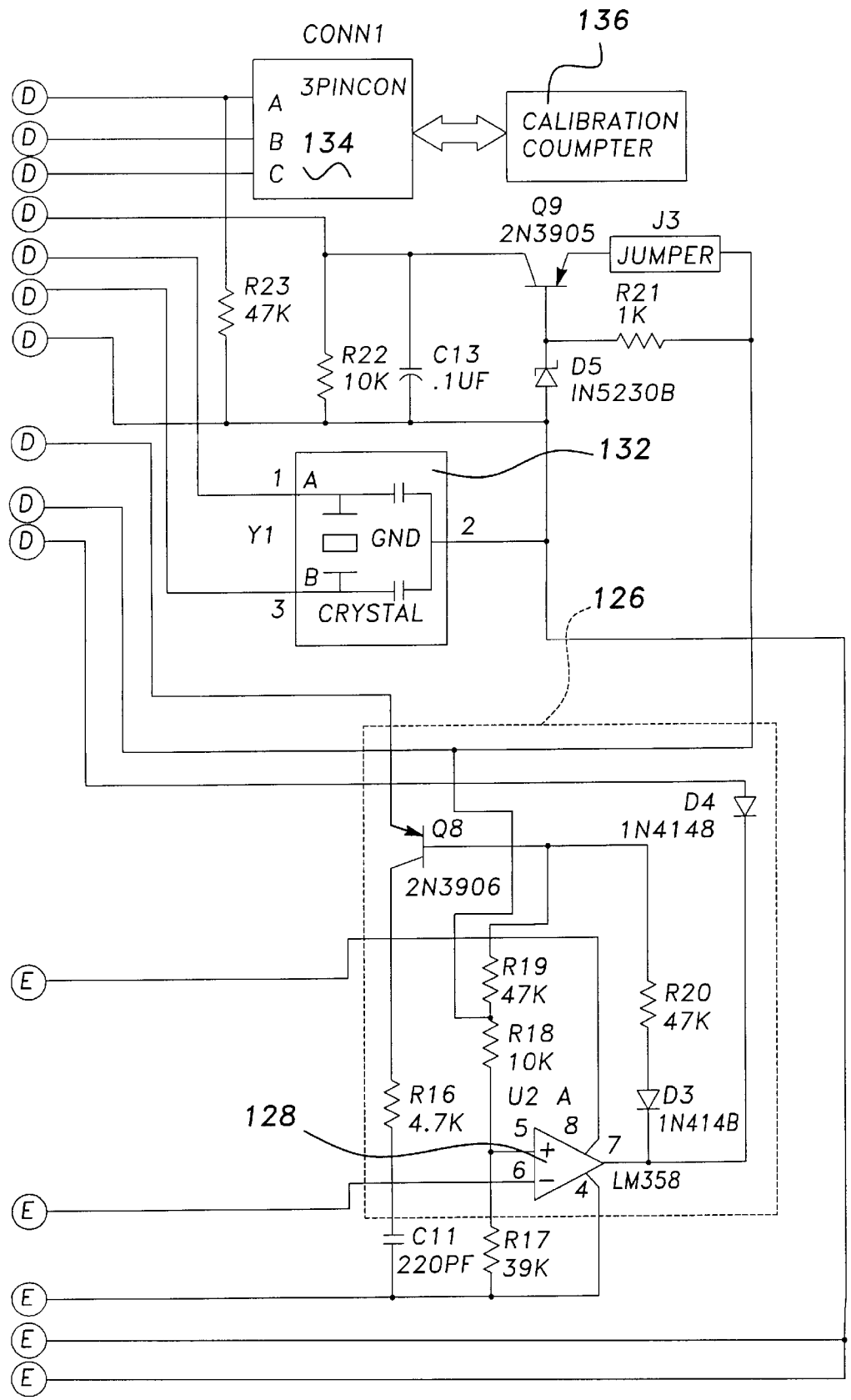

It will be noted that transistors Q5 and Q6 can also be deprived of base current by the fault detection circuit 126 (FIG. 13e). When the output of op amp 128 goes low, indicating a fault condition, circuit line 150 is pulled low. Accordingly, the base drive current to transistors Q5 and Q6 is diverted via lines 148 and 150 to ground. Also, when the output of op amp 128 goes low, transistor Q8 turns on. When transistor Q8 turns on, the negative input of op amp 128 is forced to a logic high level by a signal from pin 13 of the microcontroller 108 (FIG. 13c). This acts to latch op amp 128 on. At this point the user must turn the mower 100 off and then on again to go through a motor initialization routine (described in connection with FIG. 17) before the microcontroller 108 resets the circuit 126. More specifically the output of the op amp 128 is not allowed to go high unless and until the fault condition has abated, and the microcontroller 108 has detected this at pin 12. Only at that point is pin 13 brought low by the microcontroller 108, which allows the negative input of op amp 128 to drop down below the threshold signal on its positive input. This causes the output of op amp 128 to go high, turning off transistor Q8, and resetting the circuit 126.

Figure 14:
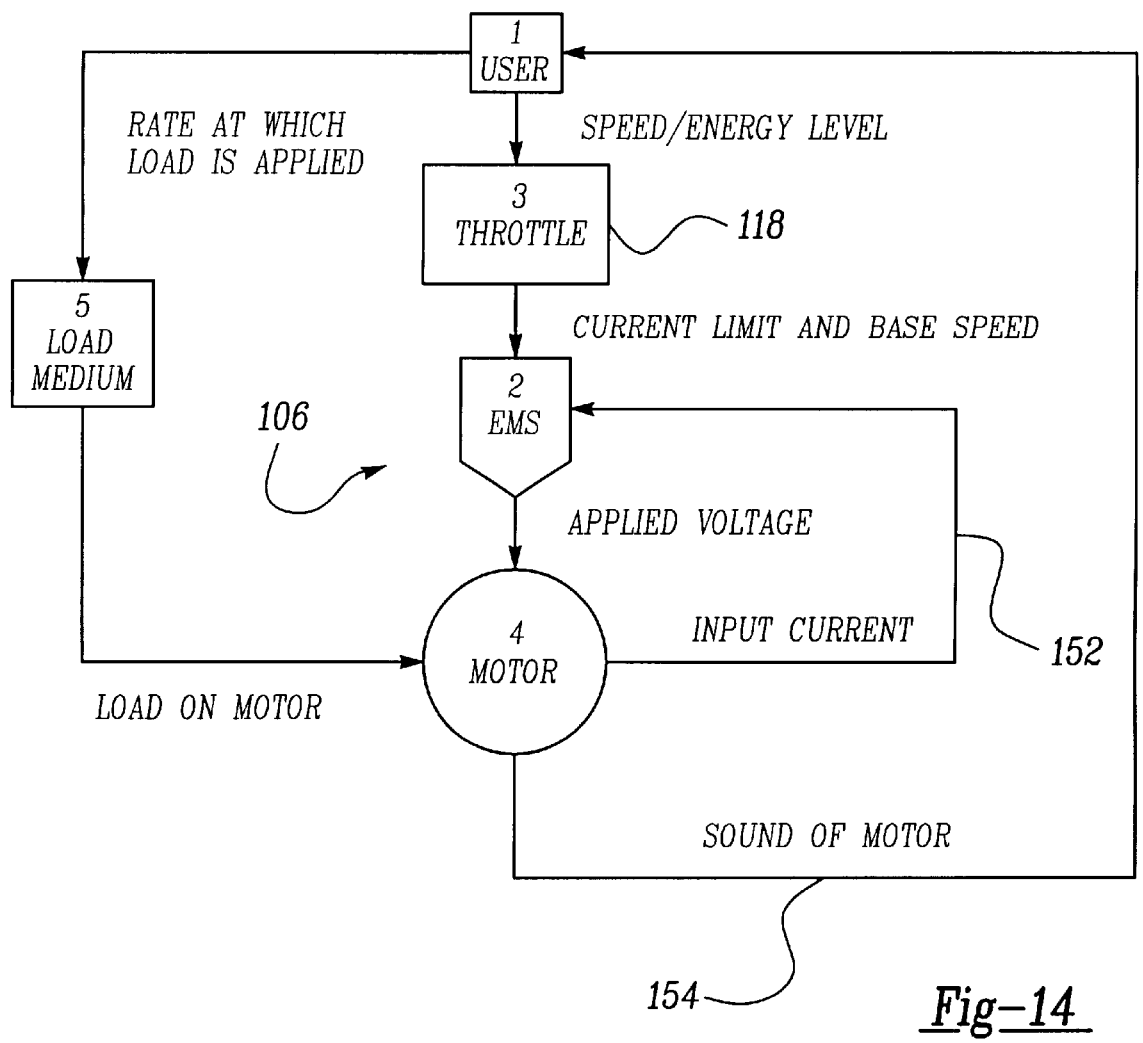
FIG. 14 is a simplified flowchart of the overall system of the present invention illustrating the feedback provided to a user of the mower.

Referring now to FIG. 14, a very simplified flow chart is shown illustrating the interaction of the various elements which affect control of the motor of the mower 100, and further how the energy management system 106 controls the speed of the motor in accordance with the load experienced by the motor and the throttle setting selected by the user. The load experienced by the motor is represented by box 5 as a "medium" load. This load is, in fact, the weight of the cutting blade secured to the motor and the "drag" on the blade caused by the grass or vegetation being cut by the blade.

The user sets the throttle 118 in accordance with a desired blade speed. The energy management system 106 determines an appropriate duty cycle needed to drive the motor at the desired speed selected by the user. The current drawn by the motor is monitored via line 152 and fed back to the system 106. The duty cycle of the PWM drive signal is then adjusted by the system 106 as needed to maintain the speed of the motor at the user selected speed. As will be explained further, if the load should increase momentarily to a degree sufficient to cause the current drawn by the motor to increase beyond a predetermined amount, then the system 106 implements the speed foldback routine to automatically reduce the duty cycle of the PWM drive signal, to thereby reduce the motor speed by a amount in relation to the excess current being drawn by the motor. In this manner excessive current draw from the battery can be prevented. When the excessive load is removed, the system 106 senses this by the reduction of current drawn by the motor and readjusts (i.e., increases) the duty cycle of the PWM drive signal to begin increasing the speed of the motor back to the speed selected by the user.

The sound of the motor also provides a valuable feedback signal to the user, as indicated by line 154, to inform the user that the load on the motor has increased. This signals the user to either slow down the speed of the mower (i.e., the speed at which the mower is being propelled over the grass or vegetation) or to momentarily stop the mower, that is, stop propelling the mower over the vegetation for a second or two in order to give the motor time to recover. Thus, two levels of feedback are used to monitor the load experienced by the motor in order to avoid drawing excessive current from the battery when the motor experiences excessive high loads: the motor current which is monitored by the system 106 and the sound of the motor which is monitored by the user. Through the use of both forms of feedback, the speed of the motor can be more closely controlled to conserve battery power when the motor experiences excessive loads, which loads would otherwise draw excessive battery current and thus significantly accelerate the discharge of the battery.

Referring now to FIGS. 15–20, a detailed description of the steps of operation of the energy management system 106 of the present invention will be provided. With initial reference to FIG. 15, when the user first turns on the switch 120 (FIGS. 13a and 13b) the microcontroller 108 is initialized, its timers are reset and various registers cleared, as indicated in step 156. A check is then made to determine if a serial connection has been made with the microcontroller 108, as indicated in step 158. If so, a "test mode" routine 160 is executed. If not, a motor control initialization routine 162 is executed. Essentially, this routine, which will be described further in connection with the flow chart of FIG. 17, loads the various operating parameters stored in the EEPROM of the microcontroller 108, determines if the battery voltage is greater than a minimum predetermined level, and sets up calculations to determine the state-of-charge of the battery and the temperature of the MOSFETS Q3 and Q4 (FIG. 13a).

Once the motor control initialization routine 162 has been executed, the system 106 waits for an interrupt from the microcontroller 108. As mentioned previously, the microcontroller 108 has a clock frequency of 8 MHz and performs one complete cycle in about 20 milliseconds. Steps 156, 158 and 162 take only on the order of about 6–8 milliseconds to execute. Once the interrupt is received at step 164, a motor control routine 166 is executed. If the battery voltage drops below a minimum predetermined value (Vbatt$_{sd}$) for a predetermined length of time, then a "shut down" routine 168 is executed. Otherwise, the PWM duty cycle is adjusted by the microcontroller 108. It should be noted that the duty cycle is adjusted in accordance with two slew rates. The first slew rate implements a "soft start" to limit the increase in the PWM duty cycle when the motor first starts. In this manner the brief but high current draw normally associated with all motors when first turning on is avoided. The first slew rate is implemented for about the first 16 "counts" of a loop counter of the microcontroller 108, which corresponds to about 0.32 seconds. After that, the second slew rate, which allows for a more rapid rate of change of the PWM duty cycle, is employed. The second slew rate helps to prevent excessive current draw from the battery if the mower 100 experiences a step increase in load which would otherwise cause a very significant increase in motor current. The second slew rate also helps to prevent excessive current draw from the battery if the throttle 118 (FIGS. 12 and 13a, 13b) is at or near a "wide open" setting when the mower 100 is started.

Figure 15:
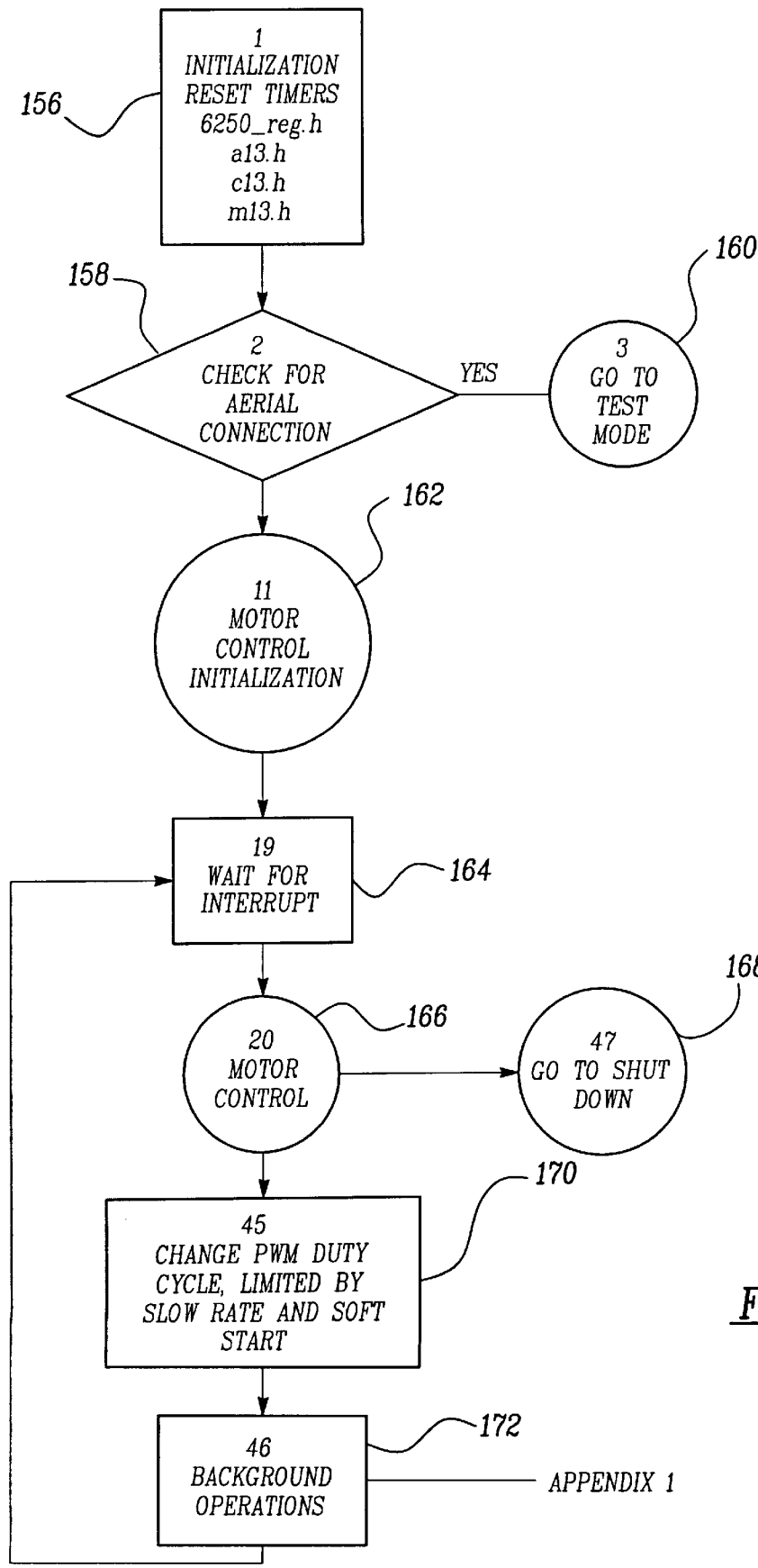
FIG. 15 is a flowchart of the basic operation of the system.

With further reference to FIG. 15, once the PWM duty cycle has been adjusted as indicated in step 170, various background operations are executed, as indicated in step 172. These background operations include outputting the loading parameters listed in Appendix 1, outputting the state-of-charge to the LED display 102, and keeping track of the time the mower 108 is on and the number of times the mower has been turned on. The system 106 then again waits for another interrupt before repeating steps 166, 170 and 172.

Figure 16:
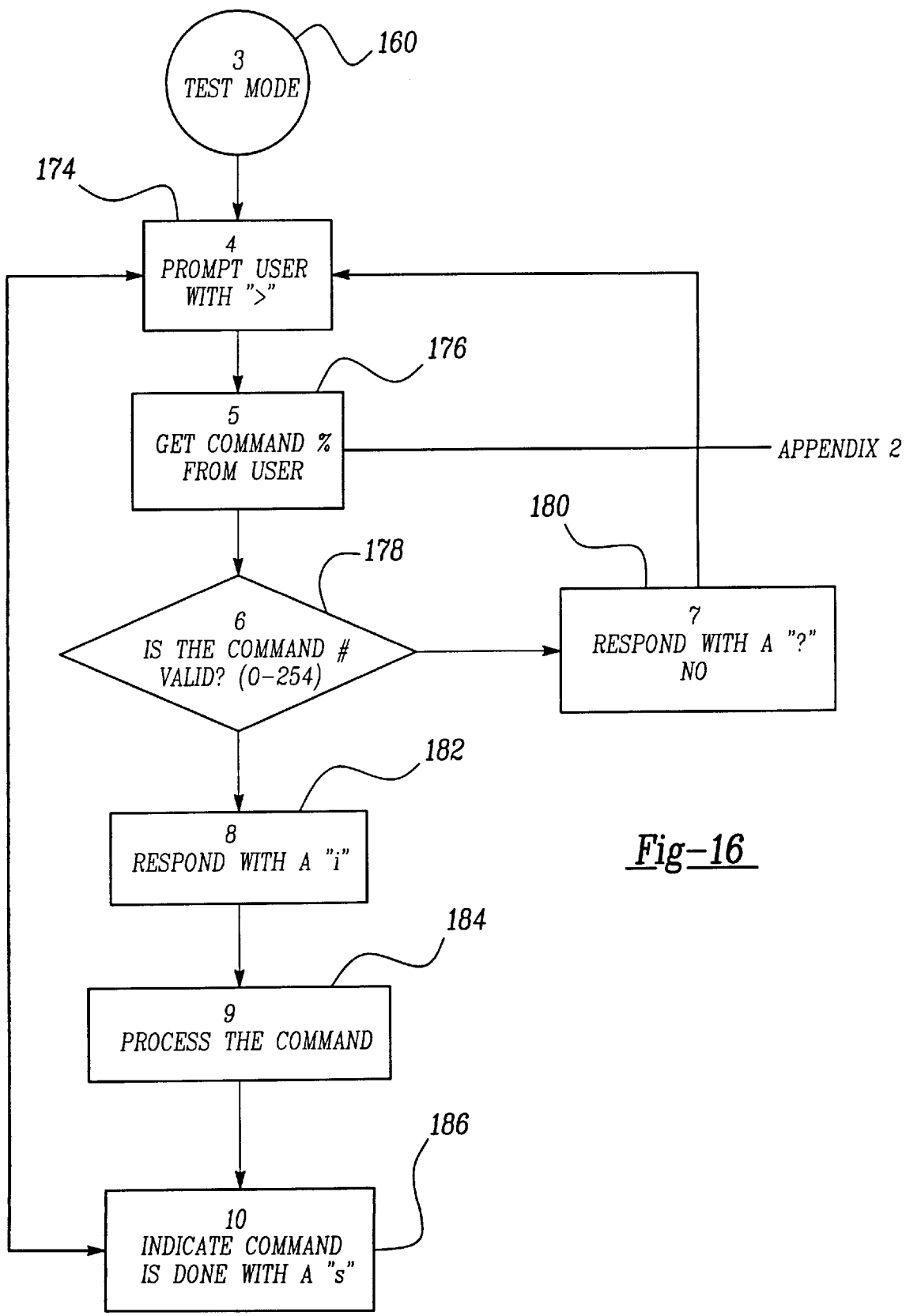
FIG. 16 is a flowchart of the test mode routine used by the system during factory calibration.

Referring to FIG. 16, the test mode routine 160 is illustrated in greater detail. This routine is used when the external calibration computer 136 (FIG. 13b) is coupled via a suitable serial communications interface with the connector 134 to thus enable communication with the microcontroller 108. The calibration computer 136 is prompted with a "▶" by the system 106, as indicated at step 174. In this regard it will be appreciated that the computer requires a suitable display in addition to a keyboard.

The test mode routine 160 next obtains a "command #" from the user at step 176. The command codes relate to various functions for calibrating the EEPROM of the microcontroller 108, such as setting the duty cycle at start up (i.e., the "soft start" duty cycle), setting the soft start slew rate, setting the second slew rate, setting the battery fail voltage (Vbatt$_{fail}$), etc. A full listing of the command codes appears in Appendix 2.

At step 178 a check is made to determine if the command number is valid (i.e., between 0 and 254). If not, an indication of an invalid command # is provided, as indicated at step 180, and the system loops back to step 174. If the command # is valid, an indication of such is given, as indicated at step 182, and the command is processed at step 184. The microcontroller 108 signals that the command has been carried out by transmitting a "$" to the external computer 136, as indicated at step 186. This procedure is repeated as the user is again prompted with another "▶" to enter another command at step 174.

Figure 17A:
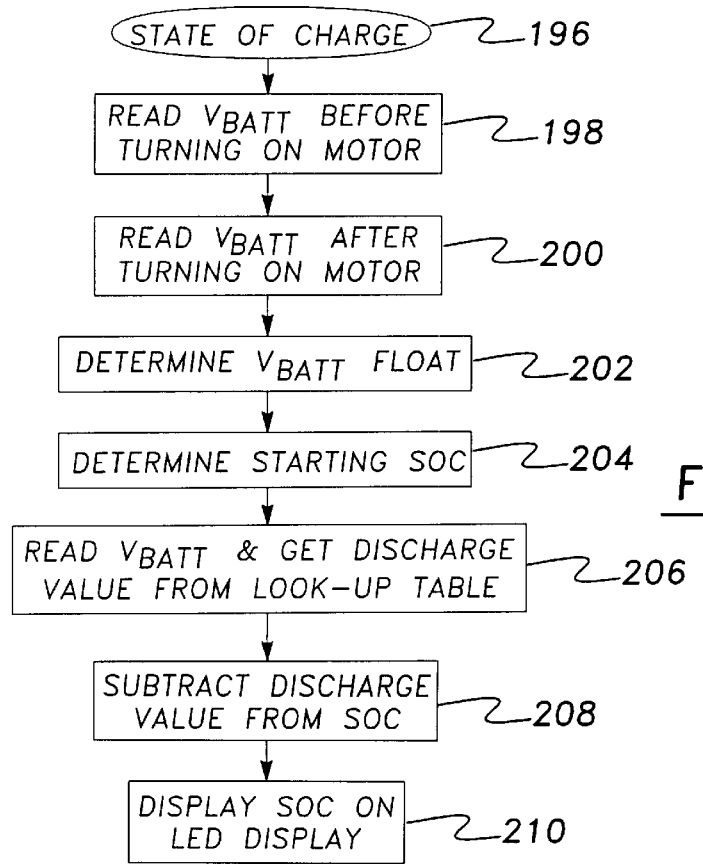
FIG. 17a is a flowchart of the steps determining the state-of-charge of the battery.
Figure 17:
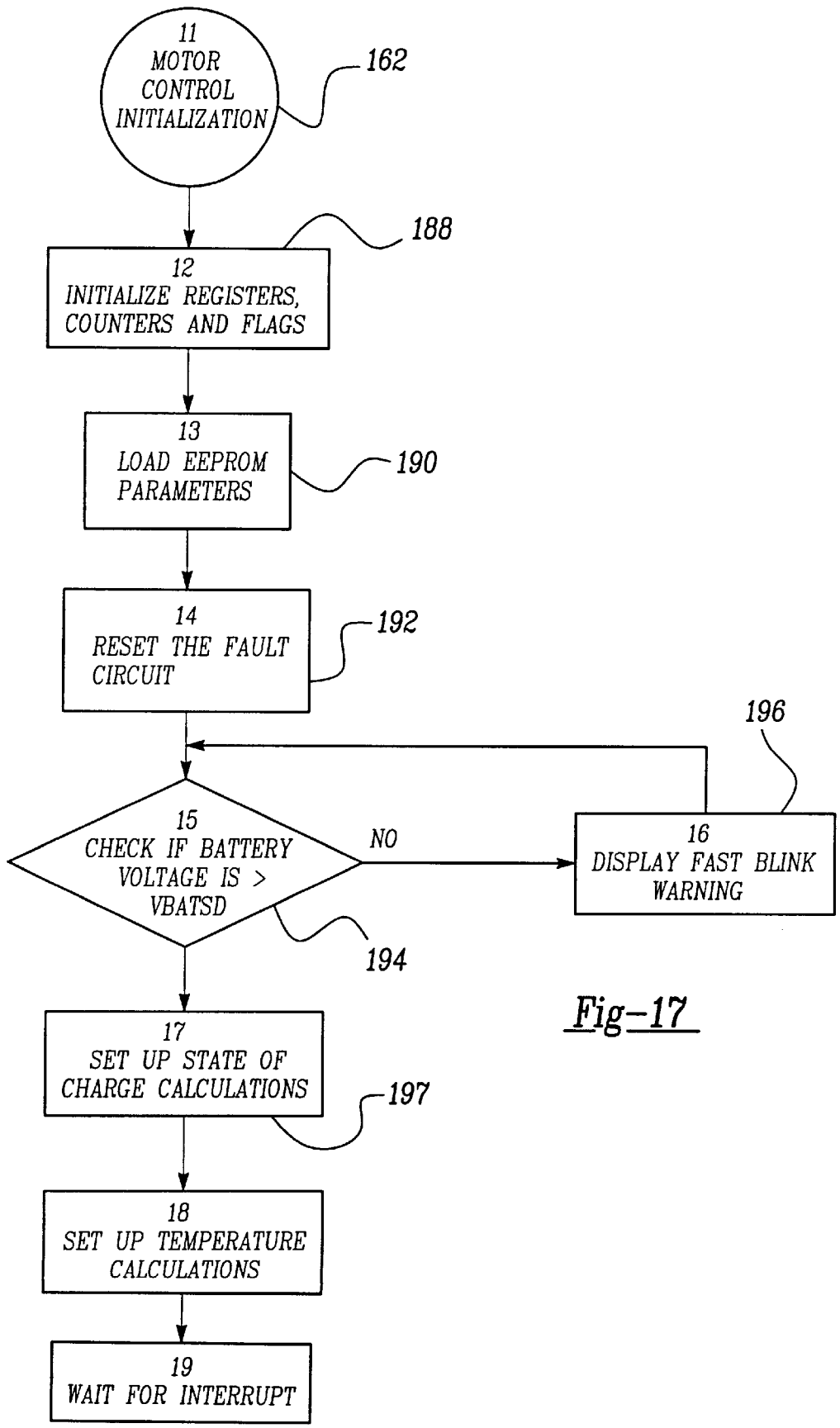
FIG. 17 is a flowchart of the motor control initialization routine of the system.

Referring now to FIG. 17, a flow chart of the motor control initialization routine 162 is illustrated. The first step in this routine is to initialize the registers counters and flags of the microcontroller 108, as indicated at step 188 and then to load the various parameters stored in the EEPROM of the microcontroller 108, as indicated at step 190. Next the fault detection circuit 126 (FIG. 13b) is reset by the microcontroller 108 as indicated at step 192. With brief reference to FIG. 13b, it will be appreciated that when the microcontroller 108 is first powered up, the fault detection circuit 126 will be latched "on" by a signal from pin 13 of the microcontroller 108 which holds the negative input of the op amp 128 at a logic high level. To reset the circuit 126, pin 13 is brought low, which causes the output of the op amp 128 to go high. At this point pin 13 is brought high again to enable the fault detection circuit 126.

With continuing reference to FIG. 17, the motor control initialization routine 162 next checks to determine if the battery voltage (Vbatt) is greater than a minimum, predetermined battery operating voltage ("Vbatt$_{sd}$"). In the preferred embodiment Vbatt$_{sd}$ is 19.2 volts. If Vbatt is less than approximately 19.2 volts, the microcontroller 108 recognizes that the battery does not have sufficient charge to power the system 106. If the battery voltage is less than Vbatt$_{sd}$, microcontroller 108 causes all of the LEDs of the LED display 102 to blink rapidly, as indicated in step 196, which indicates to the user that the battery voltage is too low to operate the mower 100. Steps 194 and 196 are then repeated as long as the system 106 is turned and Vbatt is less than Vbatt$_{sd}$. If Vbatt is initially determined to be greater than Vbatt$_{sd}$, then the state-of-charge (SOC) of the battery is determined as indicated at step 196.

With brief reference to FIG. 17a, the steps in determining and updating the SOC value will now be described. Initially, before the motor is turned on, Vbatt is checked by the microcontroller 108, as indicated in step 198, to obtain an approximate "floating" Vbatt value. This value will vary between about 24 v to 26 v depending on the state-of-charge of the battery. Next, as indicated at step 200, the battery voltage is read again after about ⅓ of a second has passed after the motor has been turned on. Since the motor is now running, the battery voltage (Vbatt) will be slightly lower than before. At step 202, a portion of the motor current sensed at this time is added to the Vbatt reading obtained just after starting the motor. This new value for Vbatt represents a compensated Vbatt reading. The compensated Vbatt reading is then compared with the initial Vbatt reading taken before the motor was turned on. If the initial Vbatt reading is less than the compensated Vbatt reading by more than a certain amount, the compensated Vbatt reading is used as the Vbatt$_{float}$ value. Otherwise the initial reading is used. This is to account for battery "droop" and to obtain a more accurate initial Vbatt value. The Vbatt$_{float}$ value represents the initial battery voltage reading which is be used to calculate the initial SOC of the battery.

With further reference to FIG. 17a, at step 204 the initial SOC of the battery is determined by subtracting the minimum permitted floating battery voltage (Vbatt$_{sd}$) that has been programmed in the EEPROM of the microcontroller 108 during calibration from the Vbatt$_{float}$ value. The value for Vbatt$_{fm}$ is programmed in the EEPRO to be about 23.8 v to 23.9 v. This calculation thus gives an absolute range of the SOC. This value is used as an upper limit or "ceiling" that is decremented as current is drawn from the battery and the battery is discharged.

At step 206, as the motor is running, the sensed battery current is monitored by the microcontroller 108 and used as an index for a look-up table. The look-up table includes values (I$_{comp}$) which represent the actual discharge experienced by the battery relative to the battery current. These values are calibrated for the battery voltage, input current and Peukert's discharge scaling. The actual table value selected (I$_{comp}$) is determined by the formula Ibatt/4.

At step 208, once the appropriate value (I$_{comp}$) is obtained from the look-up table based on the sensed battery current (I$_{batt}$), this value is subtracted from the present SOC. Finally, at step 210, the new SOC value is displayed on the LED display 102 (FIG. 13a). The equation for determining the SOC can thus be represented as follows:

$$SOC_{new} = SOC_{present} - I_{comp}$$

The SOC displayed by the LED display 102 thus provides an indication to the user of the instantaneous battery charge remaining in the battery.

Returning now to FIG. 17, after the SOC of the battery is determined, the temperature of the MOSFETs Q3 and Q4 (FIG. 13a) is determined to insure that the MOSFETs do not overheat in the event that the motor draws a high current for a significant length of time. This involves reading the battery current and obtaining two values from a look-up table in the ROM of the microcontroller 108. These two values are the MSB and LSB of a temperature adder value. The temperature adder values in the look-up table are determined empirically using several current levels to determine the time that the MOSFETs take to reach a maximum temperature limit. The temperature adder value is then added to an initial, pre-determined temperature sum. Because currents less than about 50 amps do not significantly heat up the MOSFETs, 50 amps represents the start or "biasing" point from which the temperature calculations are determined. The initial, pre-determined temperature sum is thus representative of a 50 amp current.

The MSB and LSB of the temperature adder value are then added to the initial, pre-determined temperature sum. This new sum then represents the operating temperature of the FETs. If the sum is incremented past a predetermined upper limit, then the microcontroller 108 will turn off the MOSFETs Q3 and Q4.

It should be noted that the start-up condition of the mower 100 will not be known. Put differently, it will not be known if the mower is being restarted after extended use and a short "off" period or if the mower is being started after an extended off time. Accordingly, the system 106 is initialized assuming that the MOSFETs Q3 and Q4 are hot. If the microcontroller 108 shuts down the MOSFETs Q3 and Q4 because of an excessively high temperature sum as described above, the user can restart the mower 100 after a minimum of one second. During this second the MOSFETs Q3 and Q4 can cool. Lastly, as indicated in step 214, the system 106 waits for the next interrupt before proceeding further.

Figure 18:
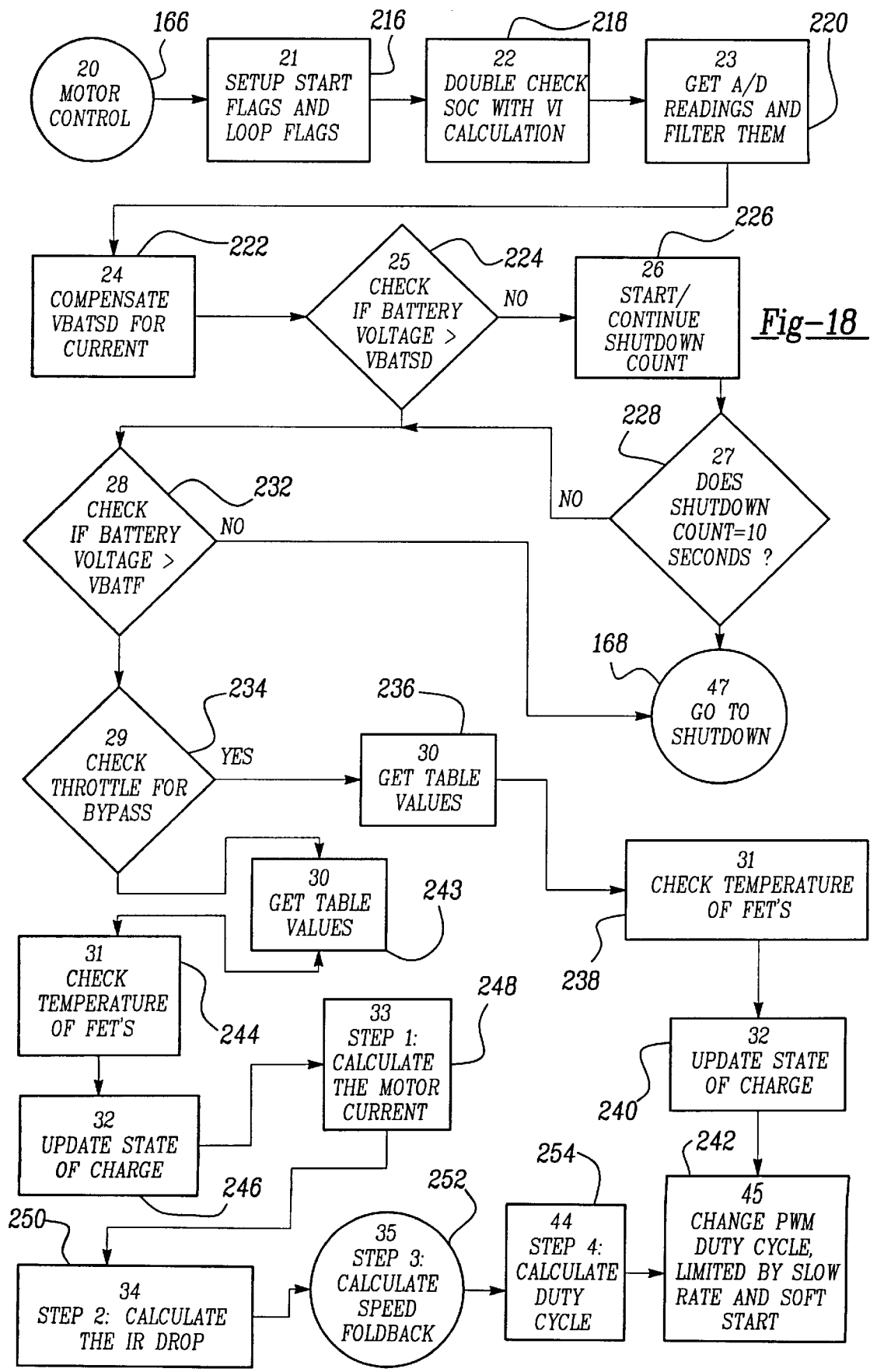
FIG. 18 is a flowchart of the motor control routine of the system.

Referring now to FIG. 18, the motor control routine 166 first mentioned in connection with the discussion of FIG. 15 will be described. At step 216, the routine begins by setting up the start flags and loop flags in the microcontroller 108. At step 218 the SOC of the battery is double checked with the calculations described hereinbefore in connection with FIG. 17a.

Next, at step 220, the microcontroller 108 obtains the A/D readings from its internal A/D convertor and filters these readings using conventional filtering techniques. The motor current (I$_m$) value obtained is the average of the 16 readings obtained during the motor control initialization routine. At step 222, the shut down voltage of the battery (Vbatt$_{sd}$) is compensated for the current. More specifically, Vbatt$_{sd}$ is reduced by a fraction of the sensed batteries current (Ibatt) to account for the drop in battery voltage due to the internal resistance of the battery.

In step 224, a check is made to determine if Vbatt is greater than Vbatt$_{sd}$. If not, the system 106 begins incrementing a "shutdown" counter, as indicated at step 226. A check is then made if the shutdown counter has reached a count equivalent to about 10 seconds, as indicated in step 228. If so, the system 106 branches to the shutdown routine, as indicated at step 230. The shutdown routine is executed to prevent the discharge of the battery below that level which could permanently damage the battery. The 10 second count is performed to provide a short time delay for the motor (i.e., Vbatt) to recover in the event a momentary excessive load is experienced by the motor which momentarily causes Vbatt to drop below Vbatt$_{sd}$. If the count at step 228 does not equal about 10 seconds, then a check is made, as indicated in step 232, to determine if Vbatt is greater than the predetermined failure voltage of the battery (Vbatt$_f$). If Vbatt is less than Vbatt$_f$, then it is assumed that the battery has failed and the shutdown routine is immediately executed.

With further reference to FIG. 18, if Vbatt is greater than Vbatt$_f$, then the system 106 checks to determine if the user controllable throttle 118 (FIG. 13a) is in the "bypass" position (i.e., the wide open position), as indicated in step 234. If so, the microcontroller 108 obtains values from the lookup table for the temperature and SOC calculations as indicated at step 236. The temperature of the MOSFETs Q3 and Q4 is then calculated, as indicated at step 238, the SOC is updated, as indicated at step 240 and the PWM duty cycle is modified, as indicated at step 242. It will be appreciated that when the throttle 118 is moved to the bypass position (i.e., "wide open"), that the second slew rate is still implemented. Thus, if the user was to adjust the throttle 118 from 50% throttle to the bypass position (i.e., 100% throttle), the increase in the duty cycle of the PWM drive signal provided by the microcontroller 108 would still be limited by the second slew rate so as to avoid a momentary but excessive current draw on the battery.

With further reference to FIG. 18, if the throttle 118 is not in the bypass position, the above-mentioned values described in connection with step 236 are obtained from the look-up table, as indicated at step 243, the temperature of the MOSFETs is determined, as indicated at step 244, and the SOC is then updated as indicated at step 246. Next, the motor current (I$_m$) is determined, as indicated in step 248 and the voltage drop across the motor is calculated, as indicated at step 250. The voltage drop across the motor can be represented by the following formula: I$_M$ * R$_M$ (where R$_M$ is the armature resistance of the motor).

In step 252, the speed foldback is calculated to determine the degree to which the motor speed should be dropped, if any, in response to a momentary excessive load on the motor. It should be noted that the speed foldback is not determined if the throttle is in the bypass position. When the throttle is in the bypass position, the motor speed will not be dropped if the mower hits a heavy clump of grass or is otherwise momentarily loaded excessively. To the contrary, in the bypass mode, the maximum PWM duty cycle will be applied to the motor at all times regardless of momentary heavy loads experienced by the motor which would otherwise, if the throttle was not in the bypass position, cause the speed foldback routine to be executed.

At step 254, once the speed foldback value is calculated, then the duty cycle necessary to effect the calculated drop in motor speed is calculated. The PWM duty cycle is then modified as needed, as indicated at step 242.

Figure 19:
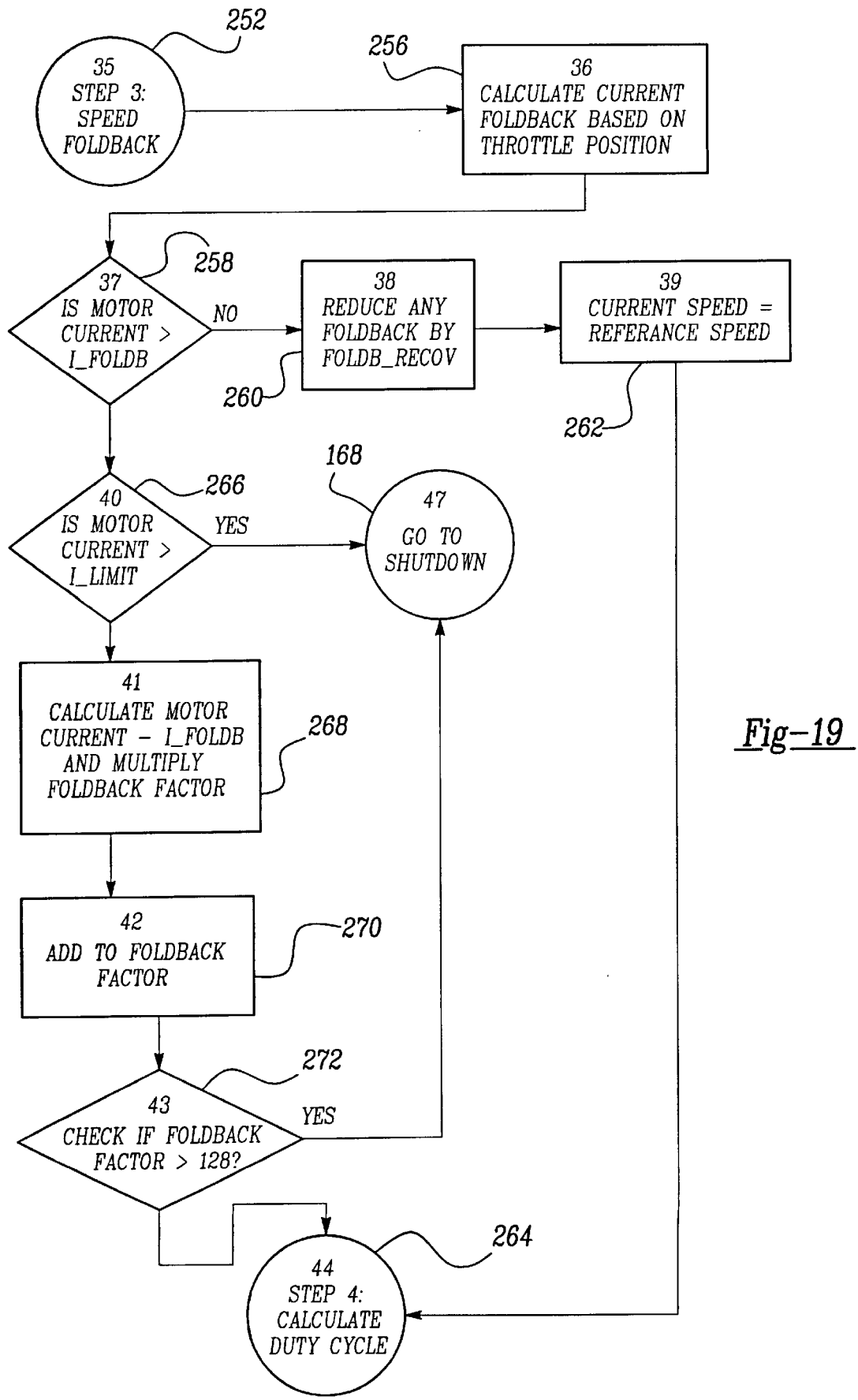
FIG. 19 is a flowchart of the speed foldback routine of the system.

Referring now to FIG. 19, the speed foldback routine mentioned in step 252 in FIG. 18 will be described. It will be appreciated immediately that through empirical testing, a table of current foldback values is determined for motor speeds ranging from between about 2000 rpm to about 3800 rpm. The current foldback levels represent the maximum current that can be drawn from the battery at a given motor speed without resulting in excessive current drain on the battery. Put differently, the current foldback levels are those current levels drawn by the motor, at a given throttle setting, beyond which would represent inefficient motor operation.

With continued reference to FIG. 19, the current foldback level is determined based on the throttle 118 position selected by the user, as indicated at step 256. Next, at step 258, a check is made to determine if the motor current (I$_M$) is greater than the current foldback level (I$_{fb}$) If not, the amount of any previously implemented speed foldback is reduced by a foldback recovery value, as indicated at step 260. Put differently, if some degree of speed foldback has been already implemented, the motor speed is increased back up almost to the level at which it was before experiencing the excessive load which caused the speed foldback to be implemented. This will be described further momentarily. At this point, however, the microcontroller 108 sets the current speed of the mower approximately equal to the reference speed selected by the user via the throttle 118. At step 264, the PWM duty cycle necessary to increase the motor speed to the reference speed is calculated.

With further reference to FIG. 19, if I$_M$ is greater than I$_{fb}$, as checked at step 258, then another check is made to determine if I$_M$ is greater than I$_{limit}$, where I$_{limit}$ is the maximum current (i.e., 150 amps) that can be drawn by the motor at any given motor speed provided the throttle 118 is not in the bypass position, as indicated at step 266. If so, the shutdown routine is immediately executed, as indicated at step 268. If not, the difference between I$_M$ and I$_{fb}$ is determined and multiplied by a predetermined foldback multiplier (approximately 0.4). The foldback multiplier is a constant which is programmed into the EEPROM of the microcontroller 108 during factory calibration. The value determined in step 268 is then added to a floating "foldback factor", as indicated at step 270. It will be appreciated that before any speed foldback is implemented, the floating foldback factor will be 0. If speed foldback is implemented during any program loop, then the floating foldback factor will be incremented. If I$_M$ falls below the predetermined current foldback level (I$_{fb}$) for the selected throttle position during any program loop, then the floating foldback factor will be reduced (i.e., the motor speed increased) by a predetermined factor, as indicated at step 272. The new PWM duty cycle will then be calculated as indicated at step 264.

The above-described speed foldback routine will now be described in connection with a specific example. If the throttle 118 is set to its halfway position, in the preferred embodiment this corresponds to a reference motor speed of about 3000 rpm (about 190 bits). Maximum motor speed (i.e. about 3800 rpm) would correspond to 256 bits. With no load on the motor, the motor will draw about 8 AMPS (about 10 bits). The voltage drop cross the armature will be fixed (I$_M$ * R$_M$). The duty cycle is equal to the reference speed selected by the user plus the voltage drop across the motor minus the foldback factor, which at this time is 0. The no load duty cycle would then be equal to about 195 bits ((190+5+0)/256) equals approximately 76%.

If the load on the motor is increased and $I_M$ rises to 50 AMPS (about 60 bits), the voltage drop across the motor would rise to about 29 bits (60 bits * $R_M$). As an example, assume that for a throttle setting of about 3000 rpm the current foldback level has been pre-programmed to be 50 amps. Since the motor current ($I_M$) is less than 50 amps, no speed foldback is implemented. Thus the floating foldback factor is still 0. The resulting duty cycle would then be 86% ((190 bits+29 bits+0)/256).

If the motor current is increased to 55 amps (about 66 bits), the voltage drop across the motor will increase to about 32 bits (66 bits * (125/256)). In addition, since the motor is now drawing 5 amps over the 50 amp limit, this difference is multiplied by the foldback multiplier (100/256, or about 0.4) to achieve a foldback value of 2 bits. This foldback value is added to the floating foldback factor. Since the floating foldback factor was initially 0, the new floating foldback factor equals: 0+(5(100/256)=2 bits. The calculated duty cycle is then equal to the reference throttle speed (3000 rpm) plus the voltage drop across the motor minus the floating foldback factor: (190 bits+32 bits−2 bits)/256. The resulting duty cycle now equals 86% (220 bits/256 bits). If the foldback factor of two bits had not been included, the duty cycle would have been about 87%.

During the next 20 ms loop, if the motor current remains at 55 amps, the floating foldback factor (previously 2 bits) would again be incremented by 2 bits to result in a new floating foldback factor of 4 bits. The resultant duty cycle would then drop to 85% ((190 bits +32 bits+4 bits)/256 bits). If the user does not slow down with the mower to reduce the load on the mower, the floating foldback factor will continue to be incremented every 20 ms until the floating foldback factor increases beyond 128 bits. At this point the microcontroller 108 will shut down the mower 100. In this example, if the motor current was at 55 amps long enough for the floating foldback factor to be incremented to 100 bits, then the duty cycle would be about 48%.

If at any time the user does remove the excessive load, then the speed foldback routine will make the following changes. When the motor current ($I_M$) falls below the current foldback level ($I_{fb}$) (in this example 50 amps) during any 20 ms program loop, the floating foldback factor will be reduced by a foldback recovery factor of 4 bits. Accordingly, if the motor had been previously loaded long enough for the floating foldback factor to be incremented to 100, then the floating foldback value would be decremented to 96 (100 bits−4 bits). The PWM duty cycle would then be increased to thus increase the speed of the motor.

In the next 20 ms loop, if the motor current ($I_M$) remains below the current foldback level ($I_{fb}$) (50 amps), the floating foldback factor will be reduced by the foldback recovery factor again (4 bits). The resultant duty cycle will then increase. The floating foldback factor will continue to be reduced until it reaches 0. When the floating foldback factor reaches 0 the speed of the motor will be back up to about 2800 rpm.

It should be noted that the motor speed will not increase entirely back to the original motor speed of 3000 rpm at a 50 amp load. This is because, in the preferred embodiment, the constant representing the resistance of the motor armature is lowered for the purpose of performing the motor voltage calculations to allow a slight drop in motor speed once the speed foldback routine is entered. This is because a slight drop in motor speed provides a level of audible feedback to the user indicating to the user that continued mowing should proceed slightly more slowly. Without this slight reduction in motor speed (and the attendant audible feedback), users may continue to push the mower 100 and rely constantly on the speed foldback routine to drop the motor speed as the load on the motor periodically increases. By reducing the motor speed just slightly once the foldback recovery has been completed, the audible signal corresponding to slightly slower motor speed provides a continued indication to the user to monitor the load experienced by the mower 100 more closely.

It should be appreciated, that the speed foldback feature of the present invention can help to significantly conserve battery power during instances where the mower frequently encounters heavy clumps of grass or vegetation. In such instances, without the speed foldback routine the blade motor of the mower 100 would frequently be drawing much higher current, which would accelerate the discharge of the battery. By reducing the blade motor speed, not only is battery power conserved but an audible signal is provided to the user to slow down or momentarily stop to avoid excessive current draw on the battery.

Figure 20:
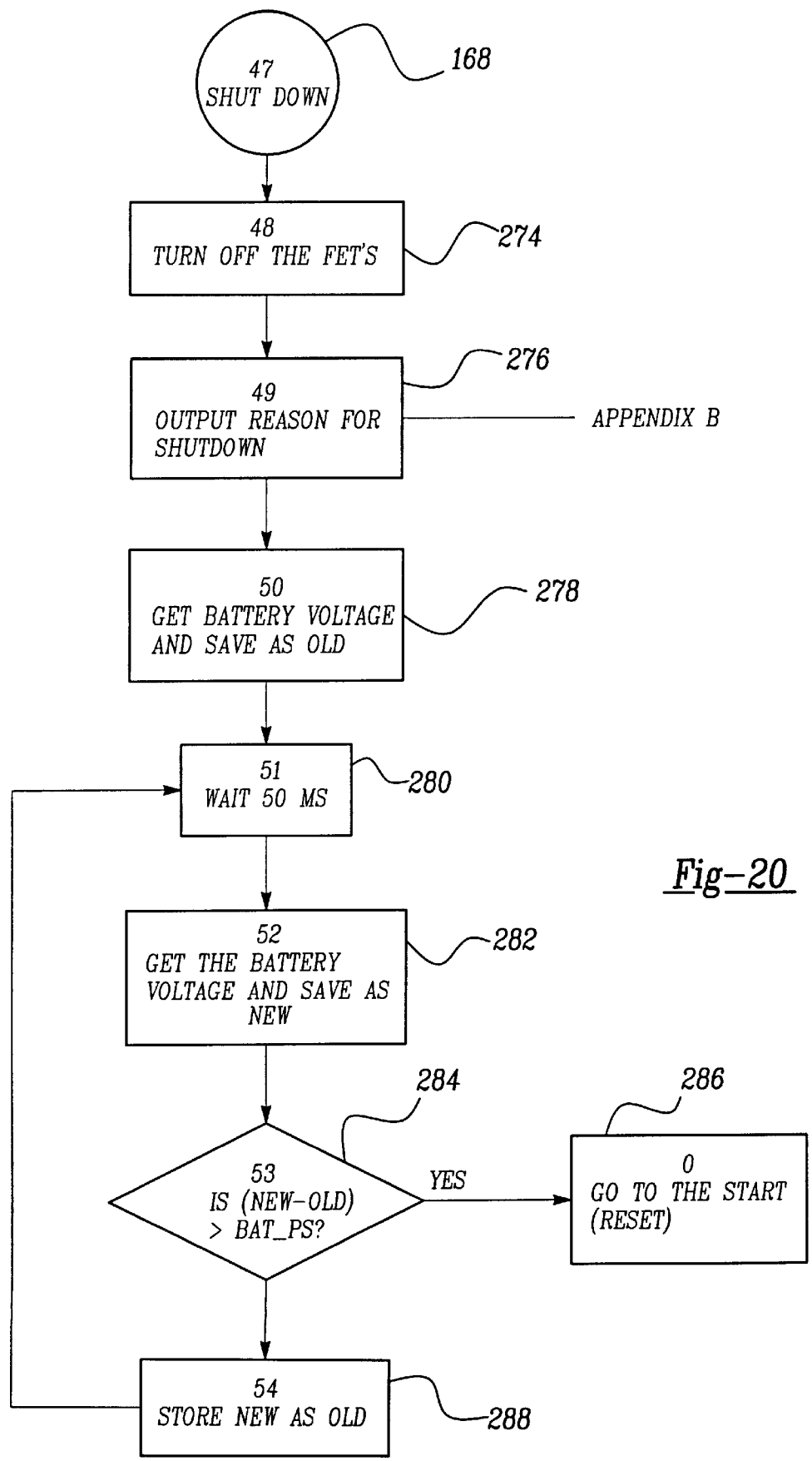
FIG. 20 is a flowchart of the shutdown routine of the system.

Referring now to FIG. 20, the shutdown routine indicated at step 168 in FIG. 15 will now be described. At step 274 the MOSFETs Q3 and Q4 are turned off and the reason for the shutdown is output to any particular test equipment that may be connected to the system 106, such as the external computer indicated in FIG. 13E. The various reasons for a shutdown to occur are listed below as follows:

BF—Battery fail condition: The battery voltage is below $Vbatt_f$

BS—Battery shutdown condition: The battery voltage fell below $Vbatt_{sd}$ for a time period longer than the shutdown count (i.e., about 10 seconds).

IO—current overload condition: The motor current (Im) reached a maximum limit or the floating foldback factor reached it's upper limit.

FB—Foldback overload condition: The applied voltage has decreased to the lowest foldback limit.

IF—Current fault condition: The battery current ($I_{batt}$) has tripped the fault detection circuit 126.

TO—High currents have created a temperature overload condition: The MOSFET's temperature counter has exceeded it's maximum level. An EEPROM flag will be set to trigger start up level.

The battery voltage at the time of shutdown is then obtained and saved as $Vbatt_{old}$, as indicated at step 278. At step 280, the system 106 waits approximately 50 milliseconds and then again reads Vbatt and saves this value as $Vbatt_{new}$, as indicated at step 282. A check is then made to determine if $Vbatt_{new}$ minus $Vbatt_{Old}$ is greater than a predetermined positive battery slope in shutdown ($Vbatt_{ps}$) as indicated in step 284. If the answer to this inquiry is yes, then the user may reset the system by turning the system 106 off and then back on again. If the inquiry at step 284 is false, then the value read for $Vbatt_{new}$ is stored as $Vbatt_{old}$, as indicated in step 288, and the system 106 again waits 50 milliseconds before checking the battery voltage again and making the comparison at steps 282 and 284. The check at step 254 provides a means to allow the user to restart the mower 100 quickly after a shutdown has occurred, provided the battery voltage (Vbatt) has increased at a rate grater than a minimum predetermined rate of change ($Vbatt_{ps}$) immediately after the shutdown. Accordingly, the user is able to quickly restart the mower 100 if a shutdown occurs because of a momentary excessive load experienced by the motor, but where sufficient battery charge is otherwise available to allow mowing to continue if the excessive load is removed.

Figure 21:
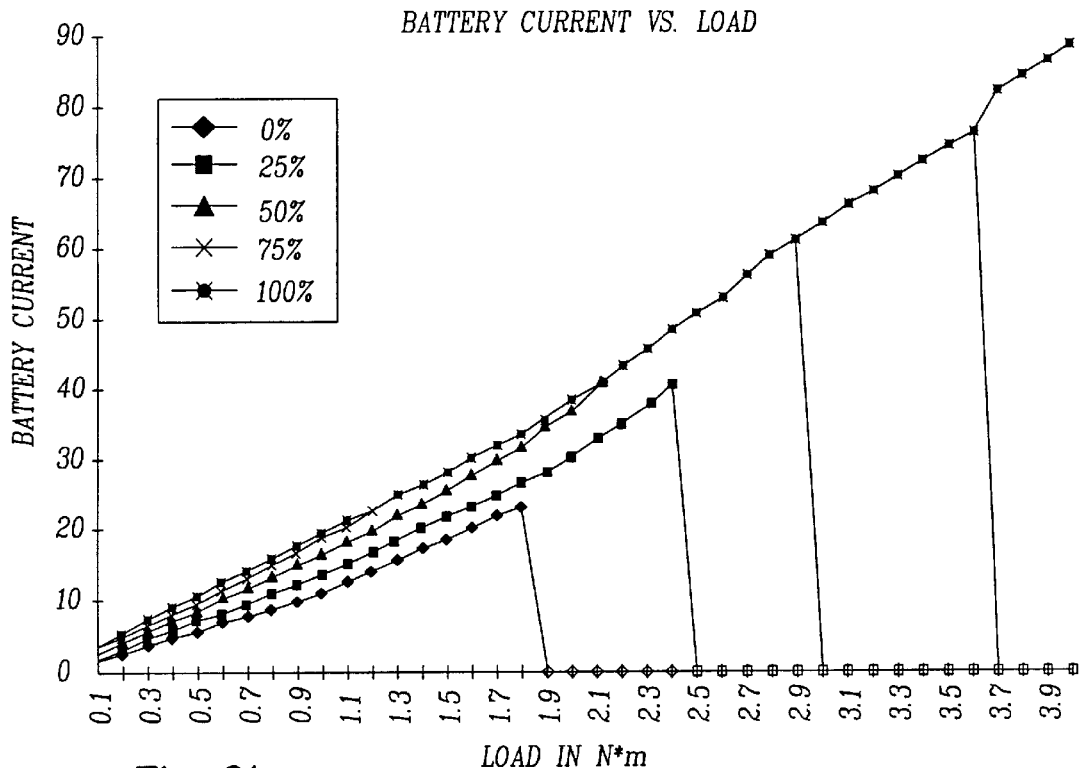
FIG. 21 is a graph illustrating the battery current drawn, relative to the load experienced, at various percentages of motor speed.

Referring now to FIG. 21, a graph illustrates the typical energy savings provided by the energy management system

Figure 22:
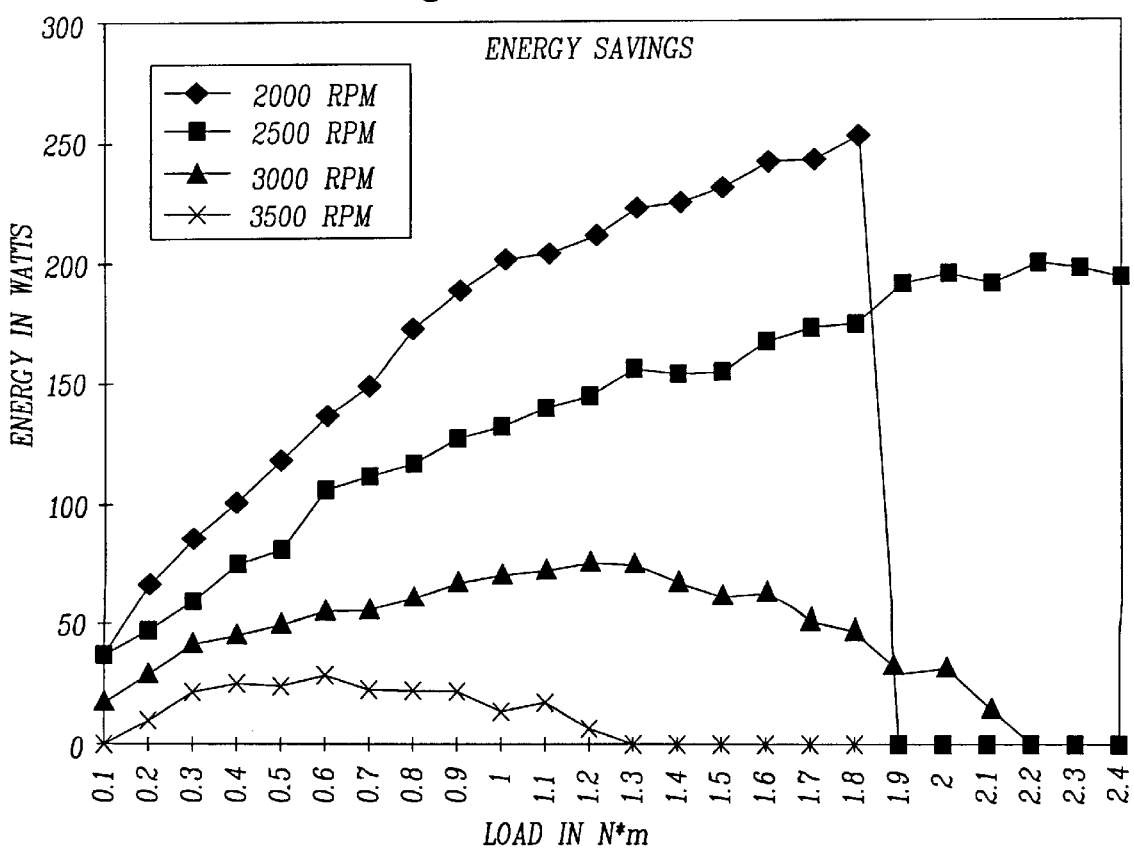
FIG. 22 is a graph of the energy savings provided by the system, relative to the load experienced, at various motor speeds.

106, relative to the load experienced, at various motor speeds. FIG. 22 illustrates the battery current drawn at various loads for a plurality of different percentages of blade speeds (i.e., 100%, 75%, 50%, 25% and 0%).

The foregoing discussion discloses and describes an exemplary embodiment of the present invention. One skilled in the art will readily recognize from such discussion, and from the accompanying drawings, that various changes, modifications, and variations can be made therein without departing from the spirit and scope of the invention.

APPENDIX 1

Background serial operations

| | | | | |
|---|---|---|---|---|
| BV Battery Voltage | 0–255 Bits | 0–29.8 Volts | 0.117 | V/Bit |
| BI Battery Current | 0–255 Bits | 0–204 Amps | 0.800 | A/Bit |
| DC Duty Cycle | 0–255 Bits | 0–100% | 0.392 | %/Bit |
| CH State of Charge HI | 0–40 Bits | 0–200% | 0.019 | %/Bit |
| CL State of Charge LO | 0–255 Bits | | | |
| TH Temperature HI | 0–255 Bits | | | |
| TL Temperature LO | 0–255 Bits | | | |
| MI Motor Current | 0–255 Bits | 0–204 Amps | 0.800 | A/Bit |
| IF Current foldback | Min–Max | Min–Max | 0.800 | A/Bit |
| CP Compensated current | 0–255 Bits | N/A | N/A | |
| TP Temperature adder | 0–65536 Bits | N/A | N/A | |
| FV Foldback value | 0–255 Bits | 0–100% | 0.392 | %/Bit |
| SP Throttle speed | 0–255 Bits | 0–100% | 0.392 | %/Bit |

APPENDIX 2

Command codes

| Code | Description | |
|---|---|---|
| 000 | Report serial number and manufacture information | |
| 003 | Report the total run time in minutes | |
| 004 | Report the total number of times the unit was activated | |
| 010 | Command the system to clear run time and activation count | |
| 100 | Command the system to measure battery voltage and send back the reading | |
| 102 | Command the system to measure battery current and send back the reading | |
| 103 | Command the system to measure fault level and send back the current | |
| 110 | Command the system to turn on the FET's | |
| 111 | Command the system to turn off the FET's | |
| 112 | Command the system to turn on the FET's with specific duty cycle (0–255) | |
| 120 | Battery fail voltage | Calibrated to 16 Volts |
| 121 | Battery shutdown voltage | Calibrated to 19.2 Volts |
| 122 | Reference speed voltage of | Calibrated with RPM 3000 current |
| 123 | Lowest voltage for state of charge | Calibrated to 24 Volts |
| 124 | Current offset | Calibrated |
| 125 | Minimum current foldback | Calibrated to 25 Amps |
| 126 | Maximum current foldback | Calibrated to 55 Amps |
| 127 | Current limit | Calibrated to 60 Amps |
| 128 | Fault detect level | Calibrated to 175 Amps |
| 129 | Feedback multiplier | Calibrated |
| 130 | Minimum throttle speed | Set to 165/255 |
| 131 | Shutdown count high byte | Set to 1 |
| 132 | Shutdown count Low byte | Set to 244 |
| 133 | EEPROM flags | Set to 15 |
| 134 | Soft start final count | Set to 100 |
| 135 | Soft start starting duty cycle | Set to 30 |
| 136 | Soft start slew rate | Set to 4 |
| 137 | Slew rate | Set to 2 |
| 138 | PWM frequency | Set to 64 |
| 139 | Battery voltage filter size | Set to 8 |
| 140 | Input current filter size | Set to 8 |
| 141 | Shutdown positive battery slope | Set to 9 |

APPENDIX 2-continued

Command codes

| Code | Description | |
|---|---|---|
| 142 | Foldback slope back to normal | Set to 4 |
| 143 | Foldback multiplier | Calibrate with feedback |
| 150 | Command the system to disable the fault latch system | |
| 151 | Command the system to enable the fault latch system | |
| 202 | Set the serial number and manufacture date | |
| 203 | Command the system to clear all EEPROM data | |
| 204 | Write all EEPROM data to the serial port | |
| 205 | Program the EEPROM with the compensated current values | |
| 254 | Command the system to leave the test mode and return to normal operation | |

What is claimed is:

1. An energy management system for use with a cordless, battery powered electric vegetation cutter having a cutting implement driven by an electric motor, the system comprising:

a user adjustable throttle control for setting the speed of said electric motor to a user selected reference speed;

a controller responsive to said throttle control for monitoring battery current being drawn by said electric motor and for generating a drive signal in accordance with said user selected reference speed;

said drive signal being incrementally reduced by said controller in the event said vegetation cutter experiences an excessive load, causing battery current drawn by said motor to exceed a threshold value, to thereby incrementally reduce the speed of said electric motor while the magnitude of said battery current drawn by said motor remains above said threshold, said drive signal being incrementally increased when said excessive load is removed such that said drive signal is increased at least close to the magnitude it was at prior to said cutting implement encountering said excessive load; and a switching circuit responsive to said drive signal for applying power to said electric motor from said battery.

2. The system of claim 1, further comprising a visual display responsive to said controller for providing a user with an indication of the approximate state of charge of a battery of said vegetation cutter.

3. The system of claim 2, wherein said display comprises a plurality of light emitting diodes.

4. The system of claim 1, wherein said switching circuit comprises a plurality of field effect transistors for controllably applying current from said battery to said electric motor.

5. The system of claim 1, wherein said controller operates to reduce said speed of said electric motor by an amount in relation to the amount by which said battery current drawn exceeds said threshold value.

6. An energy management system for use with a cordless, battery powered electric vegetation cutter having a cutting implement driven by an electric motor and a battery for supplying power to said electric motor, said system comprising:

a user adjustable throttle control for setting the speed of said electric motor to a user selected reference speed;

a controller responsive to said throttle control for monitoring battery current being drawn by said electric motor and for generating a drive signal in accordance with said user selected reference speed;

said drive signal generated by said controller being reduced by said controller incrementally, while said battery current remains above a predetermined threshold value, to thereby reduce the speed of said electric motor in relation to the degree by which said battery current drawn by said motor exceeds said threshold value, when said vegetation cutter experiences an excessive load, to thereby cause the speed of said electric motor to be reduced by a value in relation to the amount by which current drawn by said motor exceeds said threshold value; and a switching circuit responsive to said drive signal for applying power to said electric motor from said battery.

7. The system of claim 6, wherein said drive signal comprises a pulse-with-modulated drive signal; and wherein a duty cycle of said PWM drive signal is reduced in accordance with the degree by which said current exceeds that threshold value and is thereafter increased in predetermined increments when said excessive load is removed.

8. The system of claim 6, further comprising a display mounted on said vegetation cutter for providing a visual indication to a user thereof of a state of charge of said battery.

9. The system of claim 8, wherein said display comprises a light emitting diode display including a plurality of light emitting diodes illuminated by signals from said controller in accordance with the state of charge of said battery.

10. An energy management system for use with a cordless, battery powered electric vegetation cutter having a cutting implement driven by an electric motor and a battery for supplying power to said electric motor, the system comprising:

a user adjustable throttle control for setting the speed of said electric motor to a user selected reference speed;

a controller responsive to said throttle control for generating a drive signal for driving said electric motor in accordance with said user selected reference speed and for monitoring battery current drawn by said electric motor;

said controller operating to incrementally decrease said drive signal to said electric motor if said battery current exceeds a pre-determined threshold value indicating an excessive load, to thereby reduce the speed of said electric motor, and to continue to decrease said drive signal as long as said battery current is detected to be above said pre-determined threshold value, and to begin incrementally increasing said drive signal as soon as said battery current drops below said pre-determined threshold value such that said drive signal is increased at least close to a magnitude that said drive signal was at prior to said battery current exceeding said predetermined threshold value.

11. The system of claim 10, further comprising a plurality of field effect transistors responsive to said drive signal for controlling the application of said battery current to said electric motor.

12. The system of claim 11, further comprising a display for providing an indication of a state-of-charge of said battery to a user of said vegetation cutter.

* * * * *